(12) United States Patent
Pfister et al.

(10) Patent No.: US 10,917,351 B2
(45) Date of Patent: *Feb. 9, 2021

(54) RELIABLE LOAD-BALANCER USING SEGMENT ROUTING AND REAL-TIME APPLICATION MONITORING

(71) Applicant: Cisco Technology, Inc., San Jose, CA (US)

(72) Inventors: Pierre Pfister, Paris (FR); William Mark Townsley, Paris (FR); Yoann Desmouceaux, Paris (FR); Jerome Tollet, Paris (FR); Andre Surcouf, St. Leu la Foret (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/431,617

(22) Filed: Jun. 4, 2019

(65) Prior Publication Data
US 2019/0288949 A1 Sep. 19, 2019

Related U.S. Application Data

(63) Continuation of application No. 15/581,942, filed on Apr. 28, 2017, now Pat. No. 10,320,683.
(Continued)

(51) Int. Cl.
*H04L 12/803* (2013.01)
*H04L 29/08* (2006.01)
(Continued)

(52) U.S. Cl.
CPC ............ *H04L 47/125* (2013.01); *H04L 45/34* (2013.01); *H04L 45/745* (2013.01);
(Continued)

(58) Field of Classification Search
CPC . H04L 47/125; H04L 45/745; H04L 61/6059; H04L 67/1002; H04L 67/1004;
(Continued)

(56) References Cited

U.S. PATENT DOCUMENTS

| | | |
|---|---|---|
| 5,812,773 A | 9/1998 | Norin |
| 5,889,896 A | 3/1999 | Meshinsky et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Extended European Search Report from the European Patent Office, dated May 11, 2018, 13 pages, for the corresponding European Patent Application No. EP 18152894.4.
(Continued)

*Primary Examiner* — Stephen J Clawson
(74) *Attorney, Agent, or Firm* — Polsinelli PC

(57) ABSTRACT

Systems, methods, and computer-readable media for load balancing using segment routing and application monitoring. A method can involve receiving a packet including a request from a source device to an application associated with a virtual address in a network, mapping the request to a set of candidate servers hosting the application associated with the virtual address, and encoding the set of candidate servers as a list of segments in a segment routing header associated with the packet. The method can further involve determining that a first candidate server from the set of candidate servers is a next segment in the list of segments, encoding the first candidate server in a destination address field on a header of the packet, and forwarding the packet to the first candidate server.

20 Claims, 26 Drawing Sheets

Related U.S. Application Data

(60) Provisional application No. 62/452,115, filed on Jan. 30, 2017.

(51) Int. Cl.
*H04L 12/721* (2013.01)
*H04L 29/06* (2006.01)
*H04L 12/741* (2013.01)
H04L 29/12 (2006.01)

(52) U.S. Cl.
CPC ...... *H04L 67/1002* (2013.01); *H04L 67/1004* (2013.01); *H04L 67/1023* (2013.01); *H04L 67/1027* (2013.01); *H04L 69/22* (2013.01); H04L 61/6059 (2013.01)

(58) Field of Classification Search
CPC .. H04L 67/1023; H04L 67/1027; H04L 69/22
See application file for complete search history.

(56) References Cited

U.S. PATENT DOCUMENTS

| | | | |
|---|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,736,063 B2 * | 8/2017 | Wan ............... H04L 45/34 |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |

(56) References Cited

U.S. PATENT DOCUMENTS

| | | |
|---|---|---|
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |

(56) References Cited

U.S. PATENT DOCUMENTS

| | | |
|---|---|---|
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0256456 A1 | 9/2015 | Previdi et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026224 A1* | 1/2017 | Townsley ............... H04L 69/22 |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0317932 A1 | 11/2017 | Paramasivam |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

(56) References Cited

FOREIGN PATENT DOCUMENTS

OTHER PUBLICATIONS

Eisenbud, Daniel E., et al., "Maglev: A Fast and Reliable Software Network Load Balancer," 13m USENIX Symposium on Networked Systems Design and Implementation (NSDI '16), Mar. 16-18, 2016, 14 pages, Santa Clara, USA.
Patel, Parveen, et al., "Ananta: Cloud Scale Load Balancing," SIGCOMM '13, Aug. 12-16, 2013, pp. 207-218, Hong Kong, China.
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module 'Data::Locations?!'," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings On Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding For NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.

(56) References Cited

OTHER PUBLICATIONS

Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

* cited by examiner

| | BEFORE REMOVAL OF SERVER 1: | | | | | | |
|---|---|---|---|---|---|---|---|
| 110-1 — SERVER 1 | ④ | ⑥ | ⑦ | 1 | 2 | ③ | 4 |
| 110-2 — SERVER 2 | ② | ④ | 6 | ① | 3 | ⑤ | 7 |
| 110-3 — SERVER 3 | ⑥ | ④ | ② | 7 | 5 | 3 | 1 |
| 110-4 — SERVER 4 | ⑦ | ① | 2 | ③ | 4 | 5 | 6 |
| 304 — BUCKET | 1 | 2 | 3 | 4 | 5 | 6 | 7 |
| 306 — LOOKUP | 4,2 | 2,3 | 4,1 | 2,3 | 1,2 | 3,1 | 4,1 |

⎬ 320

| | AFTER REMOVAL OF SERVER 1: | | | | | | |
|---|---|---|---|---|---|---|---|
| 110-2 — SERVER 2 | ② | ④ | ⑥ | ① | 3 | 5 | 7 |
| 110-3 — SERVER 3 | ⑥ | ④ | ② | ⑦ | 5 | 2 | 1 |
| 110-4 — SERVER 4 | ⑦ | ① | 2 | ③ | ④ | ⑤ | 6 |
| 304 — BUCKET | 1 | 2 | 3 | 4 | 5 | 6 | 7 |
| 306 — LOOKUP | 4,2 | 2,3 | 4,1 | 2,3 | 4,3 | 3,2 | 4,3 |

| STATE | Incoming SR function | SR function added | NEXT STATE |
|---|---|---|---|
| LB_LISTEN | SYN from client | s1.connectAvail(lb) s2.connectForce(lb) | LB_STICKY_HUNTING |
| LB_LISTEN | data from client | s1.recoverStickiness(lb) s2.recoverStickiness(lb) | LB_STICKY_HUNTING |
| LB_STICKY_HUNTING | SYN from client | s1.connectAvail(lb) s1.connectForce(lb) | LB_STICKY_HUNTING |
| LB_STICKY_HUNTING | createStickiness(s) | remove SR header | LB_STICKY_STEER (a) |
| LB_STICKY_STEER(s) | data from client | s.ackStickiness(lb) | LB_STICKY_STEER (a) |
| LB_STICKY_STEER(s) | removeStickiness(s) | remove SR header | LB_LISTEN after 10 sec |
| SRV_LISTEN | connectAvail(lb) when avilable | remove SR header | SRV_STICKY_WAIT(lb) |
| SRV_LISTEN | connectAvail(lb) when busy | forward | SRV_LISTEN |
| SRV_LISTEN | recoverStickiness(lb) (flow not local) | forward | SRV_LISTEN |
| SRV_LISTEN | connectForce(lb) | remove SR header | SRV_STICKY_WAIT(lb) |
| ... | ... | ... | ... |

*FIG. 7*

| | | | |
|---|---|---|---|
| SRV_STICKY_WAIT (lb) | ... | connect[Avil\|Force](lb) | remove SR header | SRV_STICKY_WAIT(lb) |
| SRV_STICKY_WAIT (lb) | | data from app | lb.createStickiness(s) | SRV_STICKY_WAIT(lb) |
| SRV_STICKY_WAIT (lb) | | ackStickiness(lb) | remove SR header | SRV_STICKY_DIRECT (lb) |
| SRV_STICKY_DIRECT (lb) | | recoverStickiness(lb 2) (flow is local) | remove SR header | SRV_STICKY_STEER(lb 2) |
| SRV_STICKY_DIRECT (lb) | | ackStickiness(lb) | remove SR header | SRV_STICKY_DIRECT (lb) |
| SRV_STICKY_DIRECT (lb) | | data from app | direct return to client | SRV_STICKY_DIRECT (lb) |
| SRV_STICKY_DIRECT (lb) | | FIN from app | lb.removeStickiness(s) | SRV_LISTEN after 10 sec |

RELIABLE LOAD-BALANCER USING SEGMENT ROUTING AND REAL-TIME APPLICATION MONITORING

RELATED APPLICATIONS

The instant application is a continuation of and claims priority to U.S. application Ser. No. 15/581,942 entitled RELIABLE LOAD-BALANCER USING SEGMENT ROUTING AND REAL-TIME APPLICATION MONITORING filed Apr. 28, 2017, which claims priority to U.S. Provisional Patent Application No. 62/452,115 entitled RELIABLE LOAD-BALANCER USING SEGMENT ROUTING AND REAL-TIME APPLICATION MONITORING, filed Jan. 30, 2017, the contents of which are expressly incorporated by reference herein in their entireties.

TECHNICAL FIELD

The present technology pertains to load balancing, and more specifically to load balancing using segment routing and real-time application monitoring.

BACKGROUND

The ubiquity of Internet-enabled devices has created an enormous demand for Internet services and content. In many ways, we have become a connected society where users are increasingly reliant on network services and content. This Internet-connected revolution has created significant challenges for service and content providers who often struggle to service a high volume of user requests without falling short of user performance expectations. For example, providers typically need large and complex datacenters to keep up with network and content demands from users. These datacenters are generally equipped with server farms configured to host specific services, and include numerous switches and routers configured to route traffic in and out of the datacenters. In many instances, a specific datacenter is expected to handle millions of traffic flows and service requests.

Not surprisingly, such large volumes of data can be difficult to manage and create significant performance degradations and challenges. Load balancing solutions may be implemented to improve performance and service reliability in a datacenter. However, current load balancing solutions are prone to node failures and lack adequate bi-directional flow stickiness.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3B illustrates a schematic diagram of example permutation tables and lookup tables before and after removal of a server;

FIG. 7 illustrates an example handshake protocol state machine for a flow routed using SR load balancing;

DESCRIPTION OF EXAMPLE EMBODIMENTS

Figure 1:
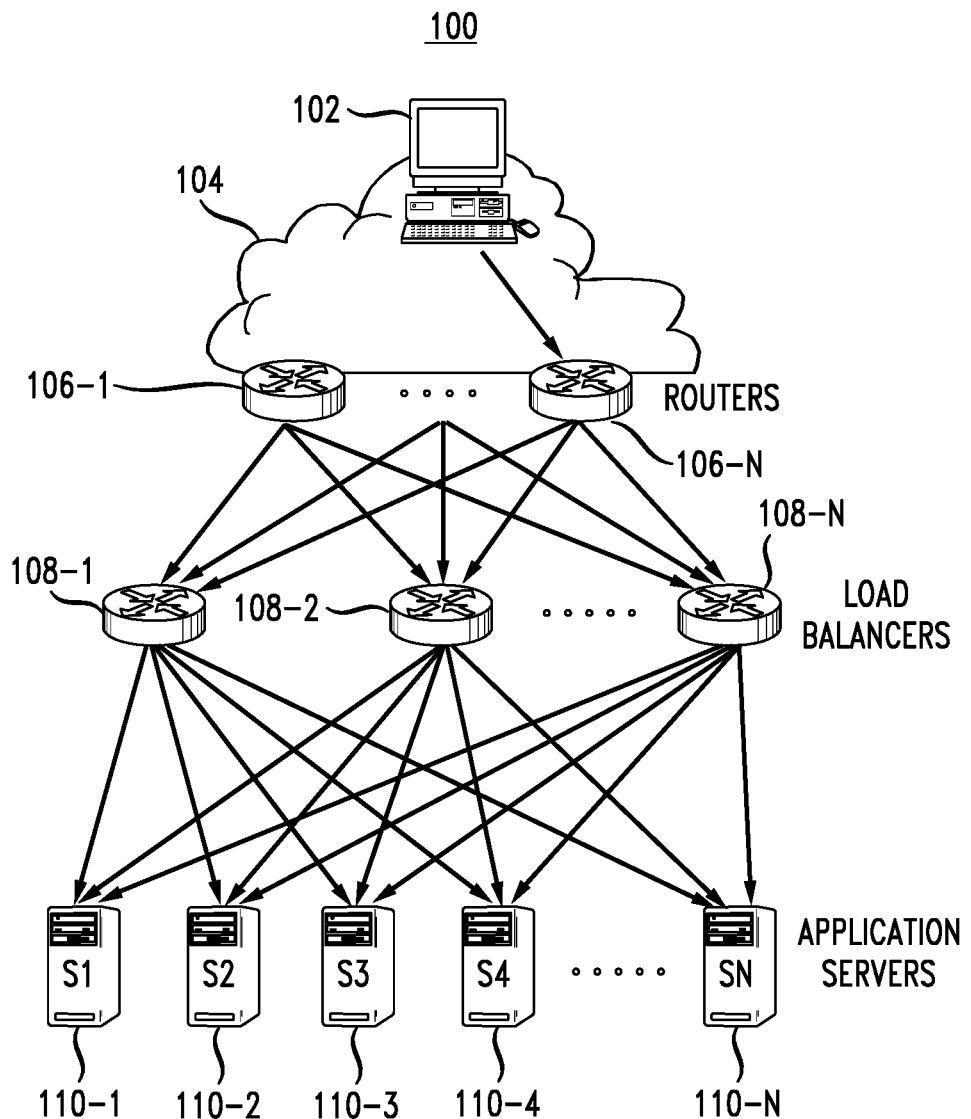
FIG. 1 illustrates an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for load balancing using segment routing and real-time application monitoring. In some examples, a method can involve receiving a packet including a request from a source device to an application associated with a virtual address in a network, and mapping the request to a set of candidate servers hosting the application associated with the virtual address. For example, the packet associated with the request can be hashed and the hash value used to identify a particular hash bucket corresponding to that packet. The hash bucket can include a segment routing policy identifying multiple candidate servers for the packet. The set of candidate servers can thus be identified from the segment routing policy in the particular hash bucket corresponding to the packet.

The method can further involve encoding the set of candidate servers as a list of segments in a segment routing header associated with the packet. For example, a segment routing header can be inserted into the packet. The segment routing header can identify a list of segments which can include the set of candidate servers identified for the packet. The list of segments in the segment routing header can enable the packet to be successively routed through the set of candidate servers, to allow each receiving server to make a local load-balancing decision to accept or reject the request associated with the packet. The list of segments can also include one or more segment routing functions for successively steering the packet through the set of candidate servers until one of the set of candidate servers accepts the request. The segment routing functions can provide instructions to a receiving node, identifying a particular action to be taken by that node upon receipt of the packet.

The method can also involve determining that a first candidate server from the set of candidate servers is a next segment in the list of segments, encoding the first candidate server in a destination address field on an IPv6 header of the packet, and forwarding the packet to the first candidate server. The destination address field can represent a next routing segment for the packet in order to route the packet to the next routing segment. When the first candidate server receives the packet, it can make a load-balancing decision to accept or deny the request associated with the packet. If the first candidate server denies the request, it can forward the packet to the next candidate server, which can be identified from the list of segments in the segment routing header. The packet can be routed through the candidate servers until a candidate server accepts the request. When a server accepts the request, it can forward the packet to the application on that server and send a reply indicating that the server has accepted the request. The reply can be transmitted to a load balancer in the network which initially routed the packet to the set of candidate servers. The reply can include a segment routing header and segment routing instructions to indicate that the server has accepted the connection, and allow the load balancer create a sticky entry for that flow which identifies the accepting server as the server associated with the flow. This can ensure bi-directional stickiness for the flow.

Description

Figure 10:
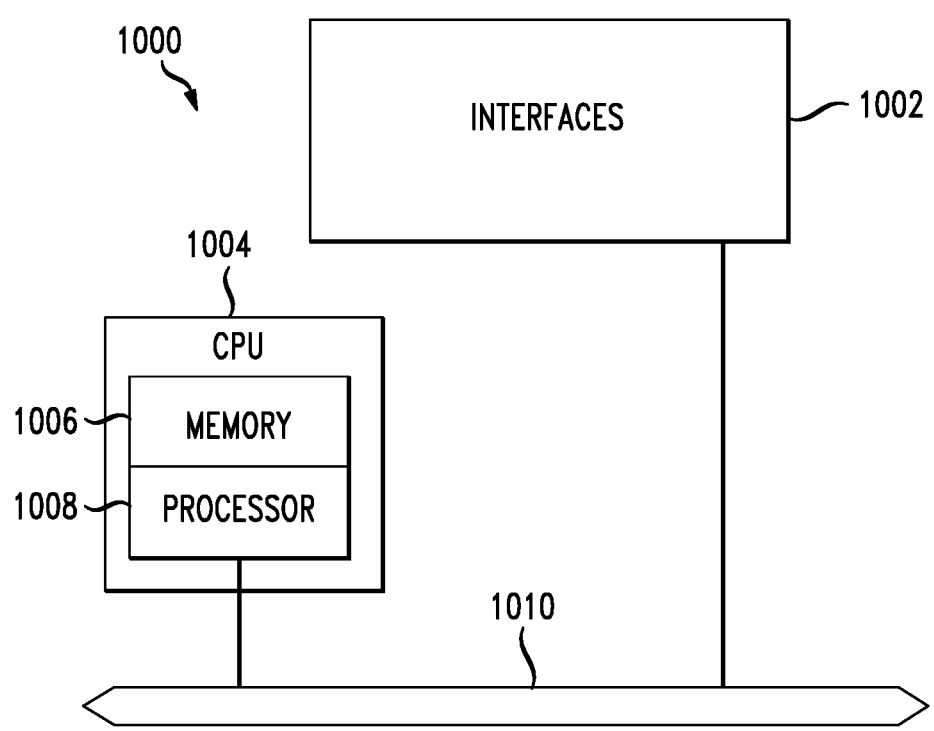
FIG. 10 illustrates an example network device in accordance with various embodiments.
Figure 11:
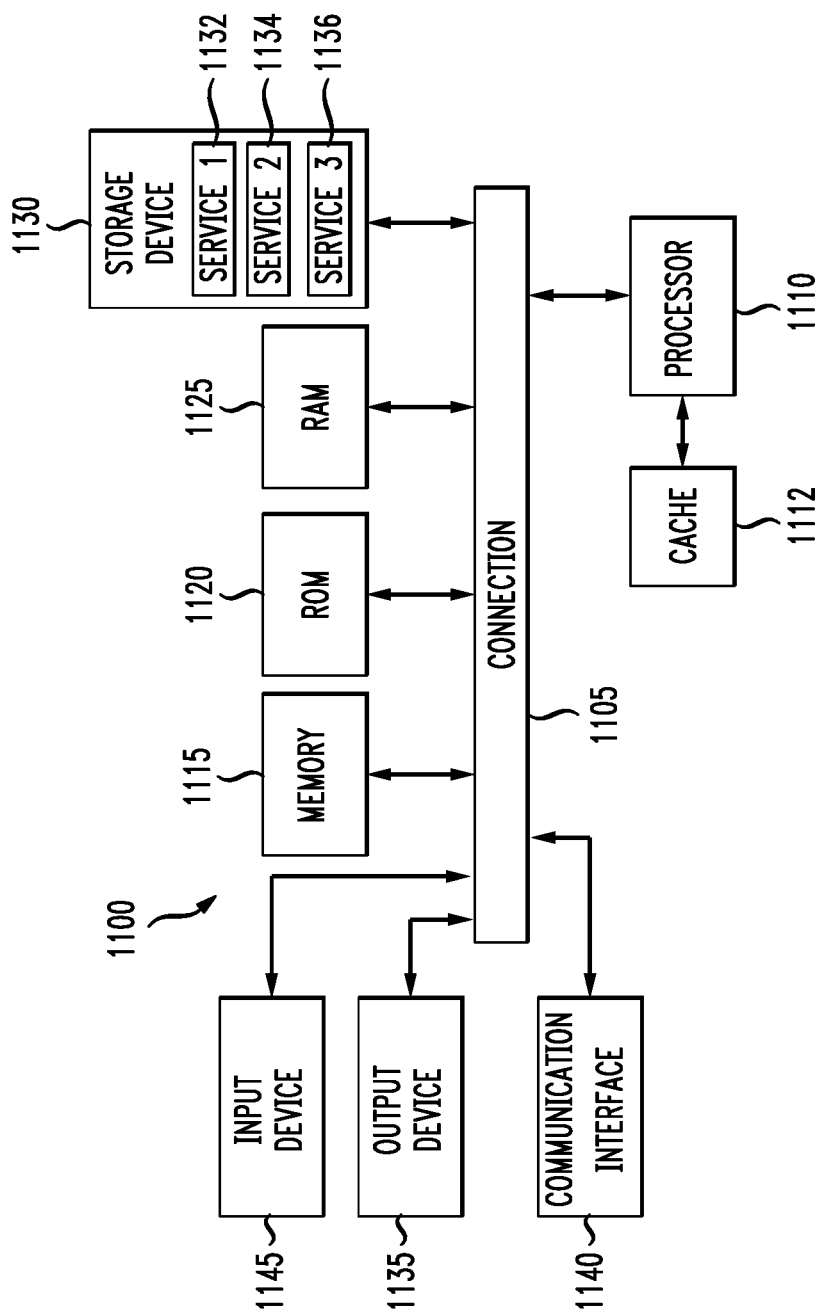
FIG. 11 illustrates an example computing device in accordance with various embodiments.

The disclosed technology addresses the need in the art for accurate and efficient application-aware load balancing. The present technology involves system, methods, and computer-readable media for application-aware load balancing using segment routing and application monitoring. The present technology will be described in the following disclosure as follows. The discussion begins with an introductory overview of application-aware load balancing using segment routing and Internet Protocol version 6 (IPv6). A description of an example computing environment, as illustrated in FIG. 1, and a detailed description of application-aware load balancing using segment routing and IPv6, as illustrated in FIGS. 2-9, will then follow. The discussion concludes with a description of an example network device, as illustrated in FIG. 10, and an example computing device, as illustrated in FIG. 11, including example hardware components suitable for hosting software applications and performing computing operations. The disclosure now turns to an introductory overview of application-aware load balancing using segment routing and IPv6.

The approaches herein can utilize segment routing (SR) to steer connection or communication requests towards multiple servers selected by a load balancer to service the requests, which can receive the requests and either accept or deny the requests based on one or more factors, such as current and future loads, server capabilities, resource availability, etc. A request will traverse through the multiple servers identified in the SR packet or header until a server accepts the request. The load-balancing approaches herein can implement IPv6 and SR, which are further described below, to steer requests efficiently while limiting state information and avoiding sequencing or ordering errors in connection-oriented communications, for example.

Load balancers can pseudo-randomly generate different segment routing lists that are used between load balancers (LBs) and segment routing (SR) nodes. SR nodes (or ASs) can accept or reject incoming connections based on actual application server load as well as the expected load to serve the request. Stickiness at load balancers can be obtained by modifying the message sent by application servers accepting a new connection toward the LBs, such that any further packet from the same connection is sent using a segment routing list including the application server's 'accepted connection address'.

For example, a flow can be hashed to multiple servers. The use of multiple servers can improve reliability and load-balancing fairness. The load balancer can receive the flow and forward the flow to the first server. The first server can decide whether to accept the connection based on one or more factors, such as current load, future load, predicted load, the flow, computing resources, etc. The second server can serve as backup in case the first server is not able to accept the connection.

To illustrate, IPv6 SR can select the correct server out of 2 servers, e.g., using IPv6 SR END.S SID (i.e., "SR hunting"). The TCP SYN packet in an SR packet can include the 2 servers as segment identifiers (SIDs). For example, the IPv6 header can include SA (Source Address)=C::, DA (Destination Address)=S1 (Server 1); and an SR Header can include (VIP, S2, S1) SL=2, where VIP is the virtual address of an application in the request, S2 and S1 are candidate servers hosting the application associated with that virtual address, and SL identifies the number of candidate servers.

Hash buckets can be generated and mapped to multiple, respective servers. In this example, each hash bucket can be bound to an SR policy identifying two candidate servers. The packet can be hashed to identify a hash bucket corresponding to that packet, and the SR policy of that hash bucket can be used to identify the candidate servers for the packet. The candidate servers can be included in a list of segments within an SR header or packet, which can be used to steer the packet to the candidate servers. The candidate servers can decide whether to accept or reject the connection as when they receive the packet as it is forwarded to the different candidate servers. For example, based on the application state of the first server in the SR policy, the first server either forwards the packet to the second server or to the first server's local application. In this way, segment routing and IPv6 can be implemented for intelligent, application-aware load balancing. IPv6 and segment routing are further described below.

IPv6 Environment

In an IPv6 environment, such as an IPv6-centric data center, servers can be reached via an IPv6 physical prefix. The servers can also run application services in isolated environments, such as virtual machines (VMs) or software containers, which can be assigned an IPv6 virtual address (VIP). In some cases, a virtual switch (e.g., Open vSwitch, vector packet processing, etc.) can be deployed on a server to route packets between physical and virtual interfaces on the server. This allows the network (e.g., data center) to be fully Layer-3 routed, without having to deploy Layer-2 tunnels such as VLANs or VXLANs.

Routing the VIPs corresponding to the different applications running in the data center can be achieved in several manners. In some examples, the virtual switches can run Interior Gateway Protocol (IGP) to propagate direct routes to the VIPs. Other examples may use a mobility protocol, such as Identifier-Locator Addressing for IPv6, wherein edge routers perform the translation between physical and virtual addresses. As will be further explained below, the approaches herein implement segment routing to steer packets through a predetermined path including multiple candidate servers for load balancing.

Segment Routing (SR)

SR is a source-routing paradigm, initially designed for traffic engineering, which allows for a packet to follow a predefined path, defined by a list of segments, inside an SR domain. The approaches herein leverage the SR architecture and IPv6 connectivity for accurate and efficient application-aware load balancing.

SR and IPv6 can be leveraged together by implementing an IPv6 header in an SR packet or an SR header in an IPv6 packet. For example, in some cases, an IPv6 extension header can be implemented to identify a list of segments for SR and a counter SegmentsLeft, indicating the number of remaining segments to be processed until the final destination of the packet is reached. In an SR packet, the IPv6 destination address can be overwritten with the address of the next segment. This way, the packet can go through SR-unaware routers until reaching the next intended SR hop. Upon receipt of an SR packet, an SR-aware router will set the destination address to the address of the next segment, and decrease the SegmentsLeft counter. When the packet reaches the last SR hop, the final destination of the packet is copied to the IPv6 destination address field. Depending on the value of a flag in the header, the SR header can be stripped by the last SR hop so that the destination receives a vanilla IPv6 packet.

To perform application-aware load balancing with minimal overhead, the network can decide to which application a request should be assigned, without requiring out-of-band centralized monitoring. We introduce a concept further described below, which will be referred to herein as "service hunting", that uses the SR architecture for application-aware load balancing.

To illustrate, assume that an application is running in several different candidate physical servers and the same VIP is used for all the application replicas. Moreover, assume that a load-balancing device resides at the edge of the data center or network, and traffic to the VIP is routed towards this load-balancing device. When the load-balancing device receives a connection request for the VIP, the load-balancing device can select a subset of the candidate servers running the application, and insert an SR header with the physical addresses of the candidate servers. This will steer the connection request packet successively through the candidate servers.

When the request reaches one of the candidate servers, rather than simply forwarding the packet to the next server in the list, the virtual switch on the candidate server can bypass the rest of the SR list and deliver the packet to the virtual interface corresponding to the server's instance of the application. The server can then locally decide whether to accept the connection or reject the connection and forward the request to the next candidate in the SR list. In some cases, the server can make such decisions based on a policy shared between the virtual switch and the application. If the server rejects the connection, it can forward the request to the next segment in the SR list, and the packet can traverse the servers in the SR list until a candidate server accepts the connection or the packet reaches the last segment in the SR list. To ensure all requests are satisfied, the last server in the list may not be allowed to refuse the connection and instead forced to accept the connection. Upon accepting a connection, the accepting server can signal to the load-balancer that the accepting server has accepted the connection, to ensure that further packets corresponding to this flow can be directly steered to the accepting server without traversing the load-balancing device and/or additional candidate servers.

This mechanism allows connection requests to be transparently delivered to several candidate servers, until finding a candidate server that is available to accept the connection. The decision to accept or reject a connection can be made locally by the individual server, in a decentralized fashion. This mechanism brings application-awareness directly to the network, and improves the load balancing across the data center or network, without requiring a centralized application monitoring system.

The application-aware load balancing approach herein can implement forwarder-side functionalities and/or server-side functionalities. For example, a forwarder service (e.g., load balancer, forwarder module, etc.) can dispatch connection requests and subsequent packets to specific servers, and the candidate servers can run a service or logic associated with the server's virtual switch, which can couple with the application in order to perform service hunting services.

The forwarder can be horizontally scaled into any number of instances. Routers at the edge of the data center or network can route traffic destined to an applications' VIPs to a forwarder. If several forwarders are deployed in the data center or network, routing protocols such as equal-cost multi-path routing (ECMP), can be used to evenly distribute the traffic among forwarders. Consistent hashing can be used by the forwarders to select candidate application servers for each flow, and perform service hunting on the selected candidate application servers.

FIG. 1 illustrates a schematic diagram of an example network environment 100 for application-aware load balancing. The network environment 100 can include a data center 120. The data center 120 can represent one or more data centers and/or networks. For example, the data center 120 can be a single data center or may include a plurality of data centers. The data center 120 can be physically located in a same geographic location or distributed throughout multiple geographic locations. Moreover, the data center 120 can include forwarder-side and server-side architectures or components as will be further described.

The client 102 can connect with routers 106-1 through 106-N (collectively "106" hereinafter) in the data center 120 via a network 104. The client 102 can be any computing device, such as a laptop, a desktop, a tablet computer, a mobile phone, a server, a smart device (e.g., smart television, smart watch, etc.), an internet of things (IoT) device, a remote network or data center, etc. The network 104 can include any number or type of networks, such as a private network (e.g., local area network), a public network (e.g., the Internet), a hybrid network (e.g., virtual private network), a cloud network, etc.

The routers 106 can serve as edge devices in the data center 120, and route traffic to and from the data center 120. Thus, the routers 106 can connect the data center 120 with network 104, client 102, and any other external networks or devices. The routers 106 can serve as the egress and ingress point for the data center 120. The routers 106 can also route traffic internally within the data center 120 to other routers or switches, network devices or services (e.g., appliances, firewalls, load balancers, etc.), and application servers 110-1 through 110-N (collectively "110" hereinafter) in the data center 120.

The application servers 110 can include physical machines or resources hosting applications, isolated environments, or services in the data center 120. For example, the application servers 110 can be physical servers running various applications in the data center 120. The application servers 110 can run some or all of their applications in isolated environments, such as VMs or software containers. In some cases, an application can by hosted by, and/or run on, multiple application servers 110 in the data center 120. For example, multiple application servers 110 can run instances of an application (e.g., virtual instances, replicas, parallel instances, mirror instances, etc.). To illustrate, an application can run on multiple application servers 110, to allow the multiple application servers 110 to load balance application traffic, and/or provide redundancy (e.g., backup or standby), fault-tolerance, high-availability, scalability, etc., for the application. The multiple application servers 110 can run the full application or instance of the application, or a portion of the application, such as a function in a service chain configuration.

The application servers 110 can include a physical network interface (e.g., NIC) to communicate with other devices or services (e.g., devices or services in the network environment 100). The physical network interface can be assigned a physical prefix or network address for such communications. The application servers 110 can also include one or more virtual interfaces (e.g., vNICs) which can provide virtualized or abstract representations of network interfaces and connections. Virtual interfaces can provide added flexibility and network capabilities, as well as various other benefits or services, such as aggregation of links or data, isolation of data or networks, decoupling of application and system traffic, expansion of network interfaces, network redundancy, dedicated links, and so forth. Virtual interfaces can be assigned virtual addresses (e.g., VIPs) in the data center 120. The virtual addresses can identify the virtual interfaces as well as any applications or isolated environments associated with the virtual addresses on the application servers 110.

For example, an application can be assigned a virtual address in the data center 120, which can be used to identify the application in the data center 120 and route traffic to and from the application. The virtual address can be used to steer traffic to and from a virtual instance of the application running on one or more of the application servers 110. In some cases, the virtual address can be mapped to the same application on multiple application servers 110, and can be used to communicate with an instance of the application on any of the multiple application servers 110.

The application servers 110 can include a virtual switch, such as OVS or VPP, which can route traffic to and from the application servers 110. For example, a virtual switch can route traffic between physical and virtual network interfaces on an application server, between applications and/or isolated environments on the application server, and between the application server and devices or applications outside of the application server. To illustrate, an application server can run multiple workloads (e.g., applications in different VMs or containers) assigned to different virtual interfaces and virtual addresses. A virtual switch on the application server can route traffic to and from the different workloads by translating the virtual addresses of the workloads and communicating with the virtual interfaces as well as other network interfaces such as the physical network interface(s) on the application server.

The data center 120 can also include load balancers 108-1 through 108-N (collectively "108" hereinafter). The load balancers 108 can communicate traffic between the routers 106 and the application servers 110. Moreover, the load balancers 108 can provide load balancing and forwarding services for traffic associated with the application servers 110. The load balancers 108 can select application servers 110 for a given flow to distribute flows and loads between the application servers 110 and steer traffic accordingly. The load balancers 108 can provide forwarding services using one or more server selection policies, including service hunting and/or consistent hashing, as further described below.

Figure 2:
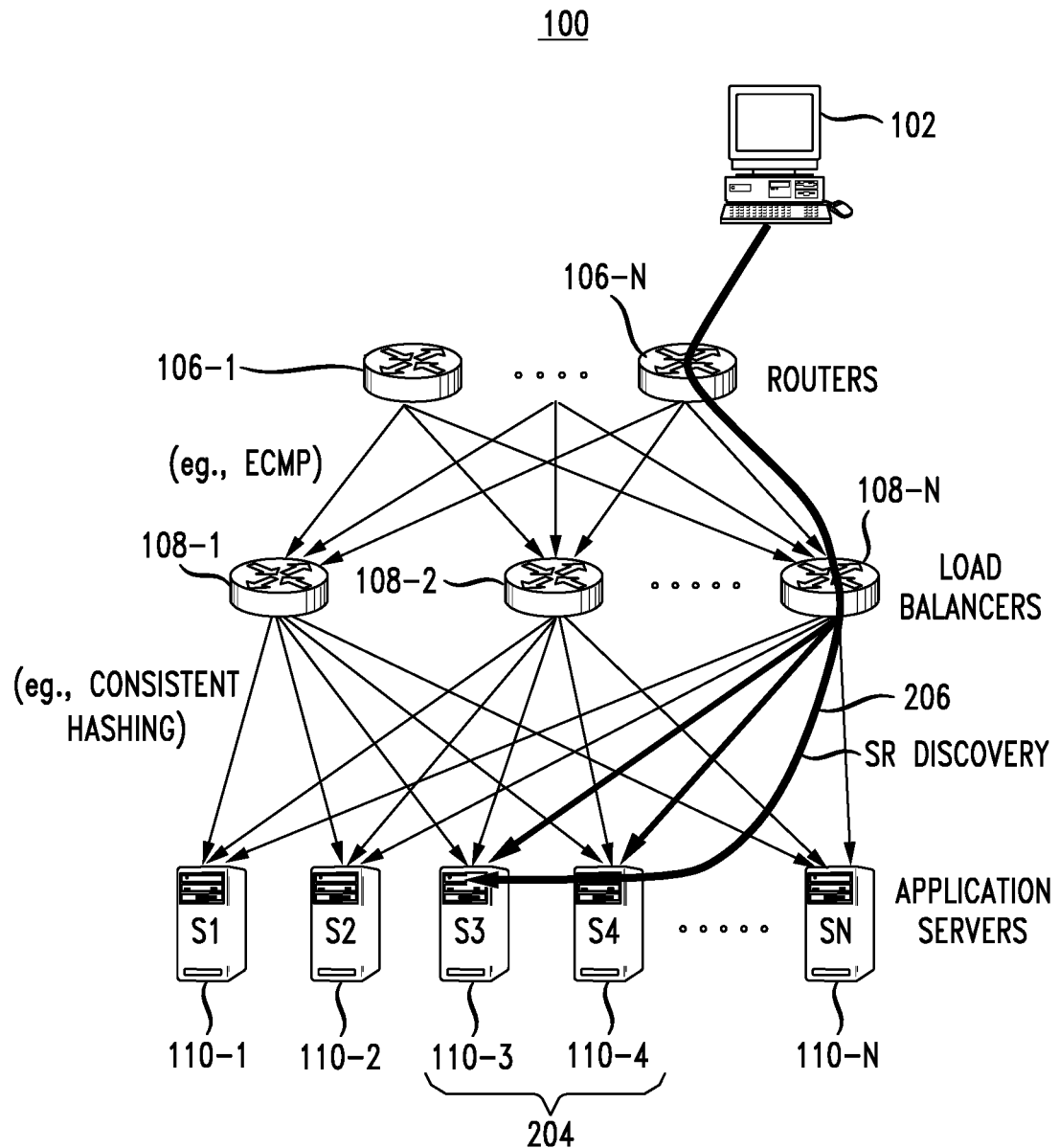
FIG. 2 illustrates an example communication path in a network environment for a packet routed using segment routing load balancing.

FIG. 2 illustrates a schematic diagram of an example path 202 determined using segment routing for application-aware load balancing of a flow in the network environment 100. In this example, client 102 transmits a flow to an application running on at least some of the application servers 110. The flow is first received by router 106-N, which forwards the flow to load balancer 108-N. Load balancer 108-N selects a set of candidate servers 204, which includes application servers 110-3 and 110-4, from those of the application servers 110 hosting the application. This allows load balancer 108-N to provide application-aware load balancing for the flow.

Load balancer 108-N then adds the set of candidate servers 204 to an SR list included in an SR header, as further described below, and forwards the flow with the SR header to the first segment in the SR header (e.g., application server 110-4). The SR header steers the flow using segment routing and IPv6 through the path 202 until application server 110-3 or application server 110-4 accepts the flow. In this example, the SR header will steer the flow first through application server 110-4, which will make a determination to accept or reject the flow based on one or more factors, such as an acceptance policy, a current workload, a capacity, a projected workload, etc. If application server 110-4 accepts the flow, it will establish a connection with client 102 and process the flow. The application server 110-4 can inform the load balancer 108-N that it has accepted the flow and will be able to communicate directly with client 102 until the connection is terminated.

On the other hand, if the application server 110-4 rejects the flow, it then forwards the flow to the next segment listed in the SR header, which in this example is application server 110-3. The SR header will therefore steer the flow through the path 202 from application server 110-4 to application server 110-3. Since application server 110-3 is the last segment in the SR list, given that the set of candidate servers 204 in this example only includes application server 110-4 and application server 110-3, the application server 110-3 may be forced to accept the flow to ensure the flow is accepted and processed. However, if application server 110-3 was not the last segment, then it could decide to accept or reject similar to application server 110-4.

To identify the set of candidate servers 204 for the flow and generate the SR list for the SR header used to steer the flow towards the set of candidate servers 204 for load balancing, the load balancer 108-N can implement a server selection policy, referenced herein as service hunting 206, as well as a hashing mechanism, referenced herein as consistent hashing.

Service Hunting

Service hunting 206 allows the set of candidate servers 204 to be selected from the application servers 110 in an application-aware fashion. Service hunting 206 allows the load balancers 108 to select multiple candidate servers for a given flow or connection, while maintaining a low overhead. The load balancers 108 can build an SR list with two or more random servers from the application servers 110 and/or a larger set of the application servers 110 running a particular application to be load balanced. For example, load balancer 108-N can build an SR list including the set of candidate servers 204 for the flow from client 102.

The load balancer 108-N can use a random or pseudo-random hashing function to map the flow (e.g., a transport control protocol (TCP) flow) identified by the flow's 5-tuple, to a list of physical prefixes corresponding to the set of candidate servers 204 hosting the application associated with the flow. The flow can then be assigned to the set of candidate servers 204 associated with the list of physical prefixes mapped to the flow. This assignment of multiple candidate servers to a flow can improve overall load repartitioning.

In some cases, a specific one of the set of candidate servers 204 assigned to the flow can be selected as the first or primary candidate server, and the other candidate server(s) can be selected to serve as backup or secondary candidate servers for load balancing. In other cases, the set of candidate servers 204 can be ordered, ranked, or prioritized for the flow. In still other cases, the set of candidate servers 204 may be randomly ordered or sequenced, or simply selected with no particular ordering or sequencing defined for them.

Consistent Hashing

Consistent hashing can allow the load balancers 108 to dynamically scale the number of instances of applications or servers to meet dynamic load requirements in the data center 120. When an application or server instance is added or removed in the data center 120, an ECMP function can be performed by the routers 106 at the edge of the data center 120 to rebalance existing flows between the load balancers 108. Consistent hashing can ensure that the mapping from flows to SR lists of candidate servers is consistent across the load balancers 108. Consistent hashing also provides mapping that is resilient to modifications to the set of candidate servers 204, which ensures that adding or removing an application server has a minimal impact on the mapping of previously existing flows.

With consistent hashing, each flow can be mapped to C servers where C is greater than one. Consistent hashing can be used to produce an SR list of candidate servers of any size, which can vary in different examples. For clarity and explanation purposes, we will use C=2 in our examples herein, which yields two candidate servers being produced in the SR list of candidate servers. Below is an example algorithm for consistent hashing:

Algorithm 1 Consistent Hashing

```
nextIndex ← [0,..., 0]
    C ← 2 { or another size for SR lists}
    t ←[(-1, -1),..., (-1, -1)]
    n ← 0
    while true do
        for i ε {0,...N - 1} do
            if nextIndex[i] = M then
                continue
            end if
            c ← p[i][nextIndex[i]]
```

-continued

Algorithm 1 Consistent Hashing

```
            while t[c][C - 1] ≥ 0 do
                nextIndex[i] ← nextIndex[i] + 1
                if nextIndex[i] = M then
                    continue 2
                end if
                c ← p[i][nextIndex[i]]
            end while
            choice ← 0
            while t[c][choice] ≥ 0 do
                choice ← choice + 1
            end while
            t[c][choice] ← i
            nextIndex[i] ← nextIndex[i] + 1
            n ← n + 1
            if n = M × C then
                return t
            end if
        end for
    end while
```

Figure 3A:
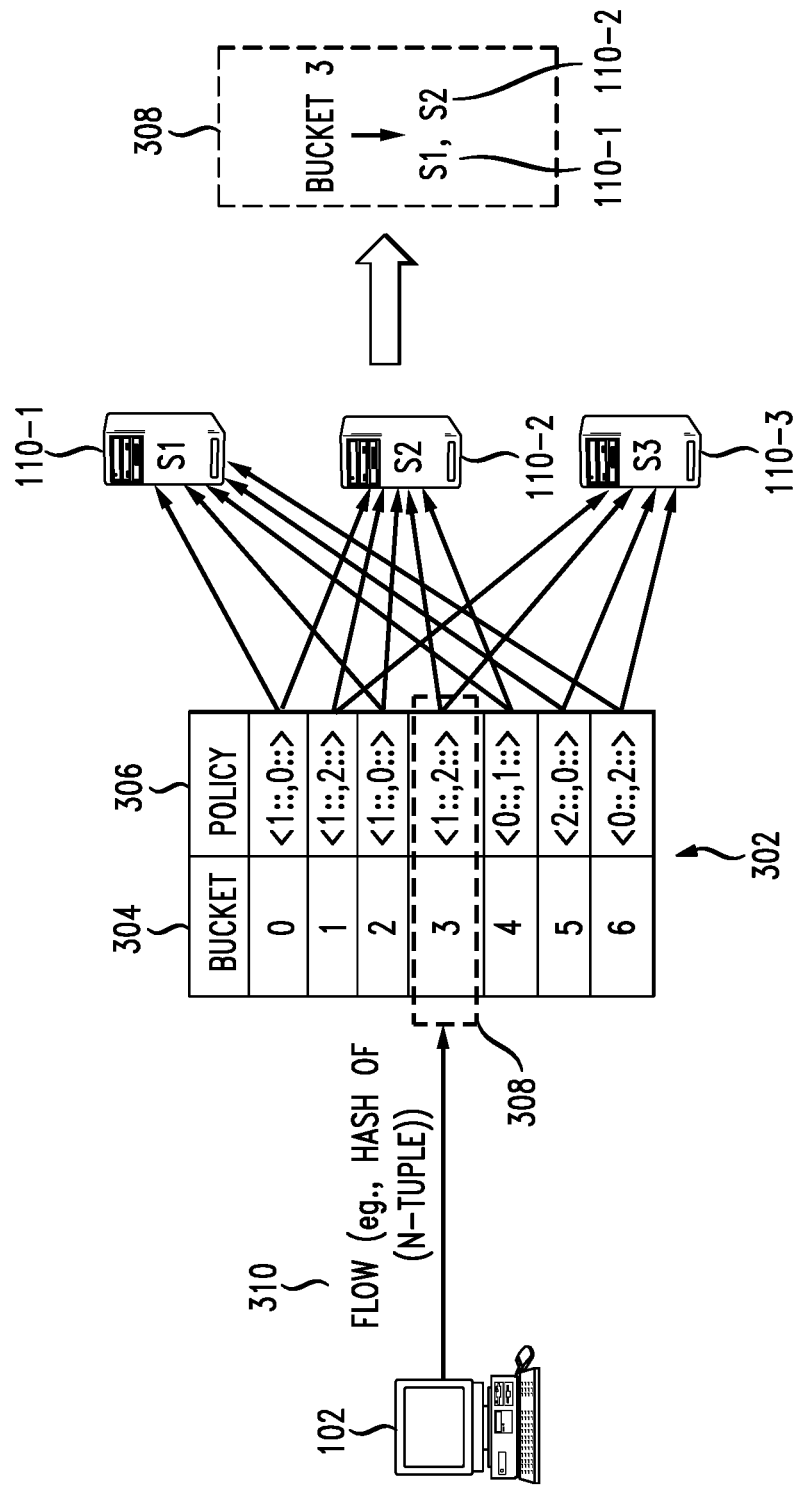
FIG. 3A illustrates a schematic diagram of an example lookup table for identifying a set of candidate servers for a flow and generating an SR list for application-aware load balancing.

FIG. 3A illustrates a schematic diagram of an example lookup table 302 for identifying a set of candidate servers for a flow and generating an SR list for application-aware load balancing. In this example, client 102 transmits a flow 310 to the data center 120 for connecting to an application running on at least some of the application servers 110. Load balancer 108-1 receives the flow 310 from one of the routers 106, and performs a lookup for the flow 310 in the lookup table 302.

The lookup table 302 contains buckets 304 containing SR policies 306. The SR policies 306 identify a set of two or more candidate servers assigned to the respective buckets 304. In this example, the lookup table 302 maps application servers 110-1, 110-2, and 110-3 to buckets 0-6, with two application servers being mapped to each bucket. The SR policies 306 in the lookup table 302 identify the specific application servers mapped to a bucket. In some examples, the SR policies 306 can identify the application servers assigned to each bucket based on the network address of each application server. For example, the SR policies 306 can include the physical network prefix or address of each application server, to identify the application servers by their physical network prefix or address.

To perform a lookup in the lookup table 302 for flow 310, the load balancer 108-1 can hash the flow (e.g., hash the N-tuple of the flow) and map the hashed flow to a particular bucket. In this example, the hash of the flow 310 yields a match 308 with bucket 3, which contains application server 110-1 (S1) and application server 110-2 (S2). Thus, the load balancer 108-1 can map the flow 310 to bucket 3 and assign application server 110-1 (S1) and application server 110-2 (S2) from bucket 3 to the flow 310. The load balancer 108-1 can then use the information from the match 308, which maps the flow 310 to the application server 110-1 (S1) and application server 110-2 (S2), to generate the SR list for the flow 310. The SR list will contain the application server 110-1 (S1) and application server 110-2 (S2) from bucket 3, based on the match 308 determined from the hash of the flow 310.

Lookup Tables

Lookup tables can be generated to identify SR lists of candidate servers using the consistent hashing. The lookup tables can include hash buckets which can be mapped to a set of candidate servers selected for each particular hash bucket. An example lookup table can be generated as follows.

Consider M buckets and N servers. For each server i∈ {0, . . . , N−1}, a pseudo-random permutation p[i] of {0, . . . M−1} is generated. These permutations can then be used to generate a lookup table t: {0, . . . , M−1}→ {0, . . . , N−1}$^C$ that maps each bucket to a list of C servers, following the procedure described above in Algorithm 1 for consistent hashing.

The table t can then be used to assign SR lists of application servers to flows: each network flow can be assigned an SR list by hashing the network flow (e.g., hashing the 5-tuple of the network flow) into a bucket j and taking the corresponding list t[j]. Hashing can be performed using a static hash function common to all load balancers 108, for example.

In some cases, the lookup table t can be generated by browsing through the application servers 110 in a circular fashion, making the application servers 110 successively "pick" buckets in their permutation until finding a bucket that has not yet been assigned C servers. Once each bucket has been assigned C servers, the algorithm can terminate.

FIG. 3B illustrates a schematic diagram of example permutation tables 320, 322 and lookup tables 330, 332 before and after removal of a server (i.e., server 110-1). This example scheme is resilient to changes to the pool of application servers 110. For example, permutation table 320 and lookup table 330 includes 4 servers (servers 110-1 through 110-4) and 7 buckets (buckets 1 through 7). For each server i, the corresponding permutation table p[i] is shown, where a circled number means that the corresponding bucket has been assigned to the server. Then, for each bucket j, the lookup table t[j] is shown. The first permutation table 320 shows the initial permutations of buckets and servers, which are used to obtain the buckets 304 and lookup entries 306 of the first lookup table 330. The second permutation table 322 shows the permutations of buckets and servers rebuilt after removal of server 110-1 (S1), which are used to obtain the buckets 304 and lookup entries 306 of the second lookup table 332.

Assume that flows are assigned to the first or second server in their SR lists with equal probability, and consider how flows mapped to a non-removed server (e.g., servers 2, 3, and 4 in this example) are affected by the table recomputation reflected in permutation table 322 and lookup table 332. For each bucket, we count one failure for each non-removed server appearing in the lookup table before recomputation, but not after recomputation.

Figure 4A:
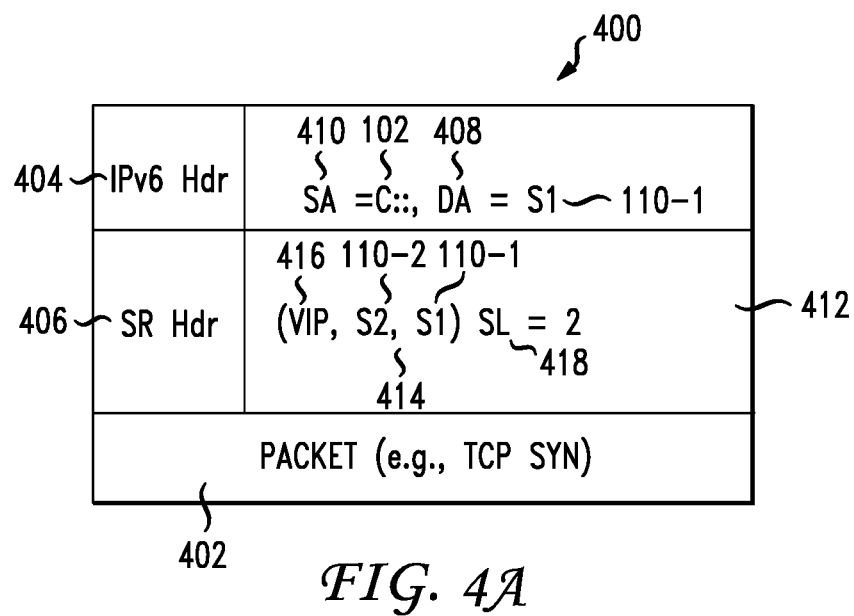
FIG. 4A illustrates an example packet configured for load balancing using segment routing and IPv6.

FIG. 4A illustrates an example packet 400 load balancing traffic using SR and IPv6. The packet 400 includes a payload 402, an IPv6 header 404, and an SR header 406. The SR header 406 can include a segments field 412 containing a list of segments 414 or SR list. The list of segments 414 can include the set of candidate servers identified for the packet 400. For example, the list of segments 414 can include server 110-1 (S1) and server 110-2 (S2), which are the candidate servers mapped to the packet 400. The list of segments 414 can also include the application address 416, which can be the virtual address assigned to the application, and represents the destination of packet 400.

The list of segments 414 in the SR header 406 can be used by nodes in an SR domain and/or SR-aware nodes to steer the packet 400 through the candidate servers 110-1 and 110-2 in the list of segments 414 and toward the application address 416. The candidate servers in the list of segments 414 can be identified using a lookup table, as previously explained. The segments field 412 can also include a counter 418, which can identify the segments left (i.e., SegmentsLeft).

The IPv6 header 404 can include a source address field 410 and a destination address field 408. The source address field 410 can identify the source of the packet 400, such as client 102. The source address field 410 can include a network address of the original source of the packet 400, a return destination for the packet 400, and/or a current source or sender of the packet 400. The source field 410 can also include commands or functions to be implemented by the node identified in the source field 410, as will be further described below.

The destination address field 408 can identify the next segment or node from the list of segments 414. In this example, the destination address field 408 identifies server 110-1 (S1) which is the first candidate server mapped to the packet 400. The destination address field 408 can be used to steer the packet 400 to the next destination. The destination field 408 in the IPv6 header 404 can allow the packet 400 to be routed even if the packet 400 traverses SR-unaware nodes.

The destination address field 408 can include a network prefix of the identified node or segment. For example, the destination address field 408 can include the physical prefix of server 110-1 (S1). This will ensure that the packet 400 is transmitted to the first candidate server, server 110-1 (S1), as the first destination server for the packet 400. The server 110-1 (S1) will have an opportunity to accept or reject the packet 400, as will be further described below. If the server 110-1 (S1) rejects the packet, the server 110-1 (S1) can then forward the packet 400 to the next segment in the list of segments 414, which in this example is server 110-2 (S2). When forwarding the packet, the server 110-1 (S1) can overwrite the destination address field 408 on the IPv6 header 404 to identify the server 110-2 (S2) as the destination, which ensures that the packet 400 is routed to the second candidate server, server 110-2 (S2). Server 110-2 (S2) will thereafter receive the packet 400 and determine whether to accept or reject (if permitted) the packet 400. This way, the list of segments 414 in the SR header 406 as well as the destination address field 408 in the IPv6 header 404 can be used to push the packet 400 to the set of candidate servers selected for that packet 400 and allow the set of candidate servers perform load balancing decisions for the packet 400 as it traverses the list of segments 414.

As will be further explained, the list of segments 414 and/or destination address field 408 can include functions or commands (hereinafter "SR functions") to be implemented by associated nodes or segments. For example, the destination address field 408 can identify server 110-1 (S1) and include a function to be applied by server 110-1 (S1), such as a connect function which server 110-1 (S1) can interpret as a request to connect with server 110-1 (S1). The destination address field 408 can thus contain the state of the packet 400, including the next destination of the packet, the source or return node, and any commands or functions for such nodes or segments.

Similarly, the list of segments 414 can include commands or functions for the segments in the list of segments 414. For example, the list of segments 414 can include a connect function for each of the candidate servers, a force connect function for the last segment in the list of segments 414, one or more parameters for one or more segments (e.g., resource identifier, flow identifier, etc.), state information (e.g., ACK, SYN, etc.), and so forth.

SR functions can encode actions to be taken by a node directly in the SR header 406 and/or the IPv6 header 404. In some examples, each node is assigned an entire IPv6 prefix. Accordingly, the lower-order bytes in the prefix can be used to designate different SR functions. In some cases, the SR functions may depend on the address of the first segment in the list of segments 414 (e.g., the "sender" of the function).

To illustrate, when a node whose physical prefix is s receives a packet with the SR header 406 containing (x, . . . , s::f, . . . ), the SR header 406 will trigger nodes to perform a function f with argument x, denoted by s·f(x).

Figure 4B:
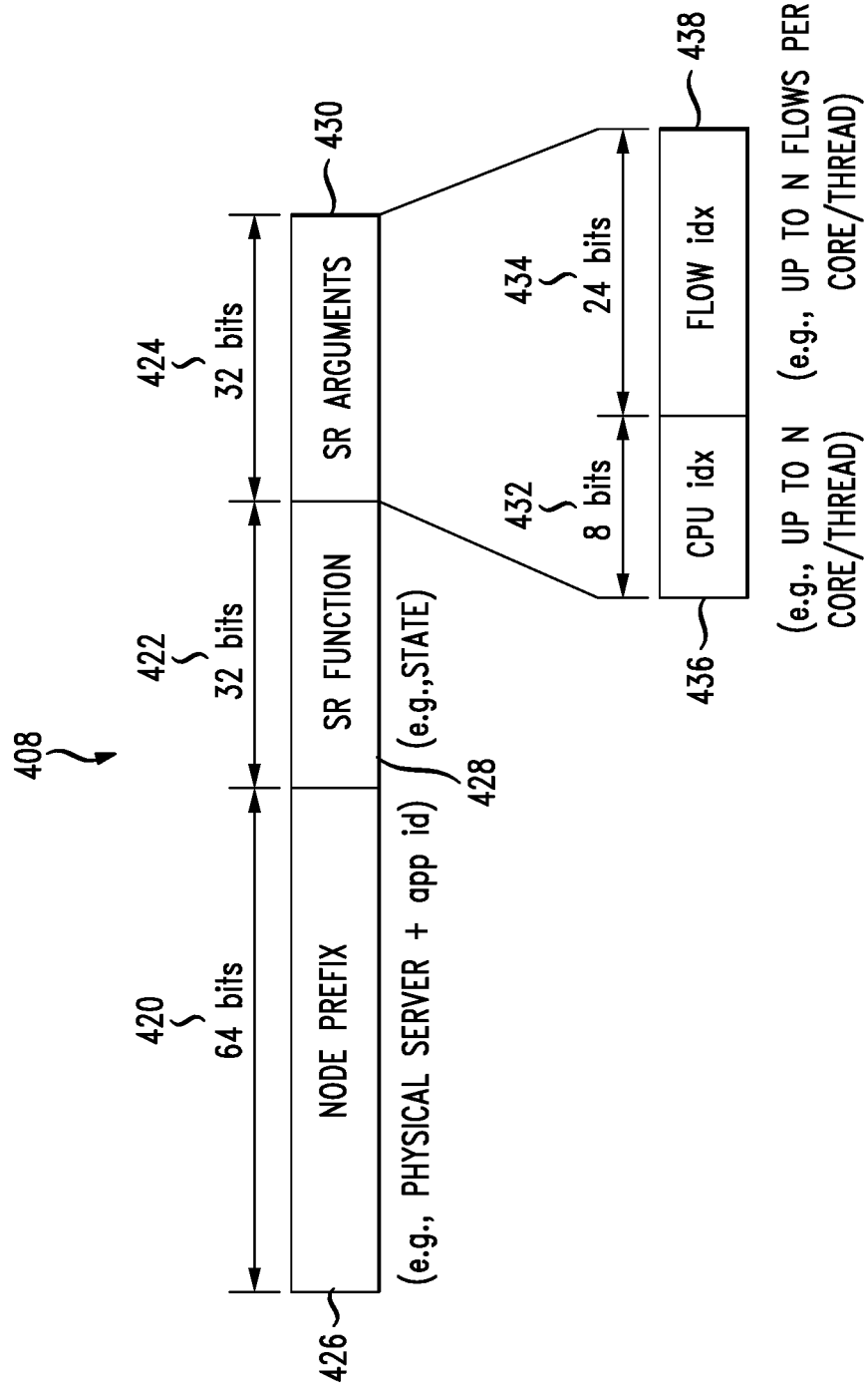
FIG. 4B illustrates a schematic diagram of an example destination address field in an IPv6 header.

FIG. 4B illustrates a schematic diagram of an example destination address field 408 in an IPv6 header 404. The destination address field 408 can include 128 bits, which can be segmented to include a first segment 420 from the first 64 bits for the node prefix 426, a second segment 422 from the next 32 bits for an SR function 428, and a third segment 424 from the next 32 bits to include any arguments 430 for the SR function 428.

The node prefix 426 can include the physical prefix of the next segment or server, as well as an application identifier. The SR function 428 can include state information associated with the node prefix 426. The third segment 424 can be further segmented into sub-segments 432,434, which can include arguments for the SR function 428, such as CPU id, Flow id, etc. The arguments can be used for flow and resource (e.g., CPU) steering and load balancing.

A handshake process between the load balancers 108 and the servers 110 can be implemented to establish flow stickiness. Flow stickiness can be accomplished while avoiding external control traffic from being generated, minimizing deep packet inspection, and steering return traffic to avoid the load balancers 108.

External control traffic can be avoided and deep packet inspection minimized by using the SR header 406 as opposed to sending custom control packets. The SR functions 428 can be used to communicate between the load balancer or forwarder nodes and the server nodes.

Figure 5A:
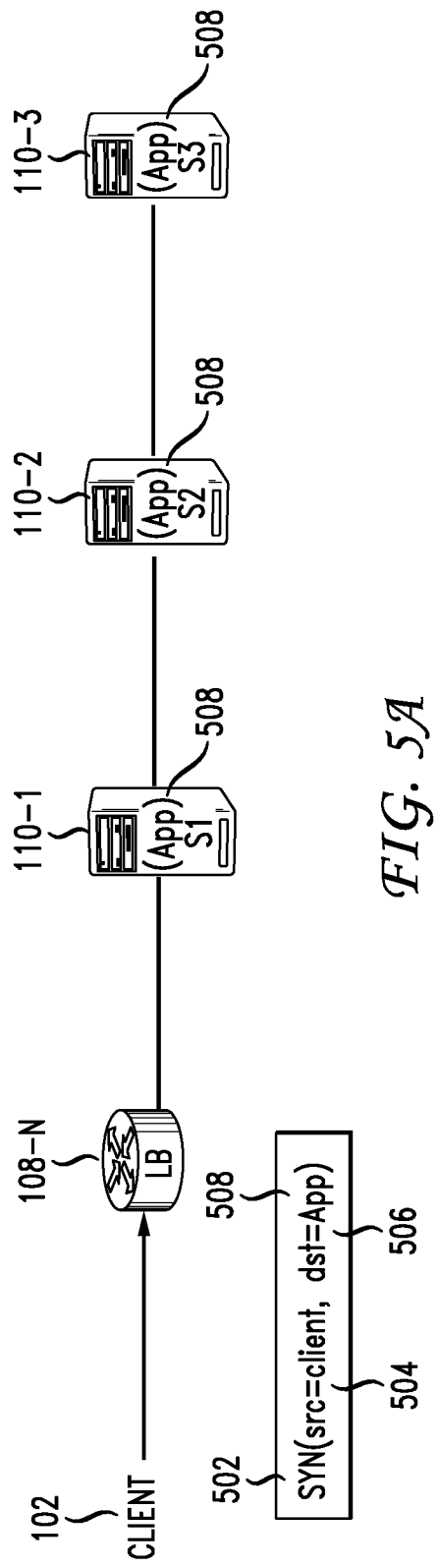
FIGS. 5A through 5H illustrate an example handshake process using SR and IPv6.

FIGS. 5A through 5H illustrate an example handshake process and using SR and IPv6. Referring to FIG. 5A, a client 102 sends a connection request 502 for an application 508 at a particular virtual address (e.g., VIP). The application 508 can be an application, service, appliance, service chain, etc. Moreover, the application 508 can be hosted within one or more software containers, virtual machines (VMs), etc.

The connection request 502 can include the source 504, which identifies the client 102, and the destination 506, which identifies the virtual address of the application 508. In this example, the connection request 502 is a TCP SYN packet for establishing a TCP handshake.

The load balancer 108-N can receive the connection request 502 and identify candidate servers 110-1 through 110-3 hosting application 508 at the virtual address by applying a hashing function to the virtual address and identifying the candidate servers 110-1 through 110-3 from a bucket that maps to the hashed virtual address. The identified candidate servers can be used to generate a list of segments for an SR header.

Figure 5B:
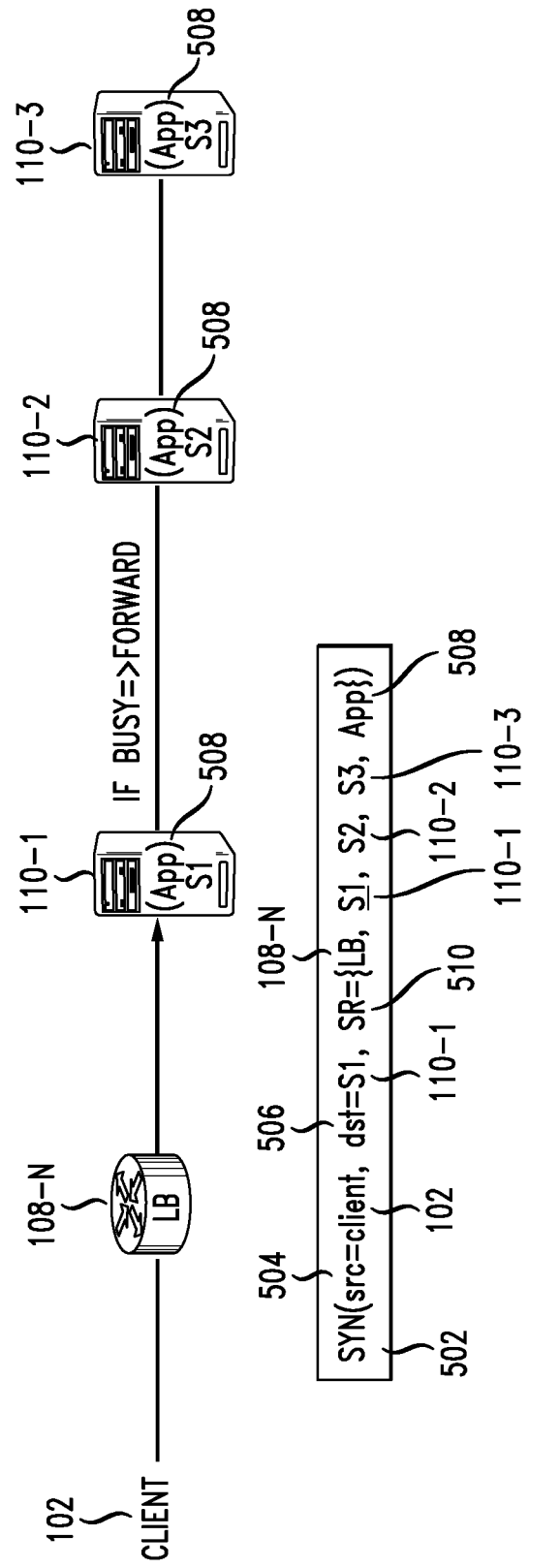

Referring to FIG. 5B, the load balancer 108-N inserts SR header 510 into the request 502. The SR header 510 includes a list of segments containing the physical addresses of the identified candidate servers 110-1 through 110-3. The SR header 510 also includes the physical address of the load balancer 108-N and the application 508 (e.g., VIP of application 508). The load balancer 108-N can also overwrite the destination 506 in the IPv6 header to identify the next segment from the list of segments in the SR header 510, which in this example is server 110-1 (S1). This will steer the request 502 to the first candidate server 110-1 (S1).

The load balancer 108-N will then forward the request 502 to the first candidate server 110-1 (S1). When the candidate server 110-1 (S1) receives the request, it will determine whether to accept or reject the request. If the server 110-1 (S1) is busy or unable to accept the request 502, it will forward the request 502 to the next segment in the list of segments from the SR header 510.

Figure 5C:
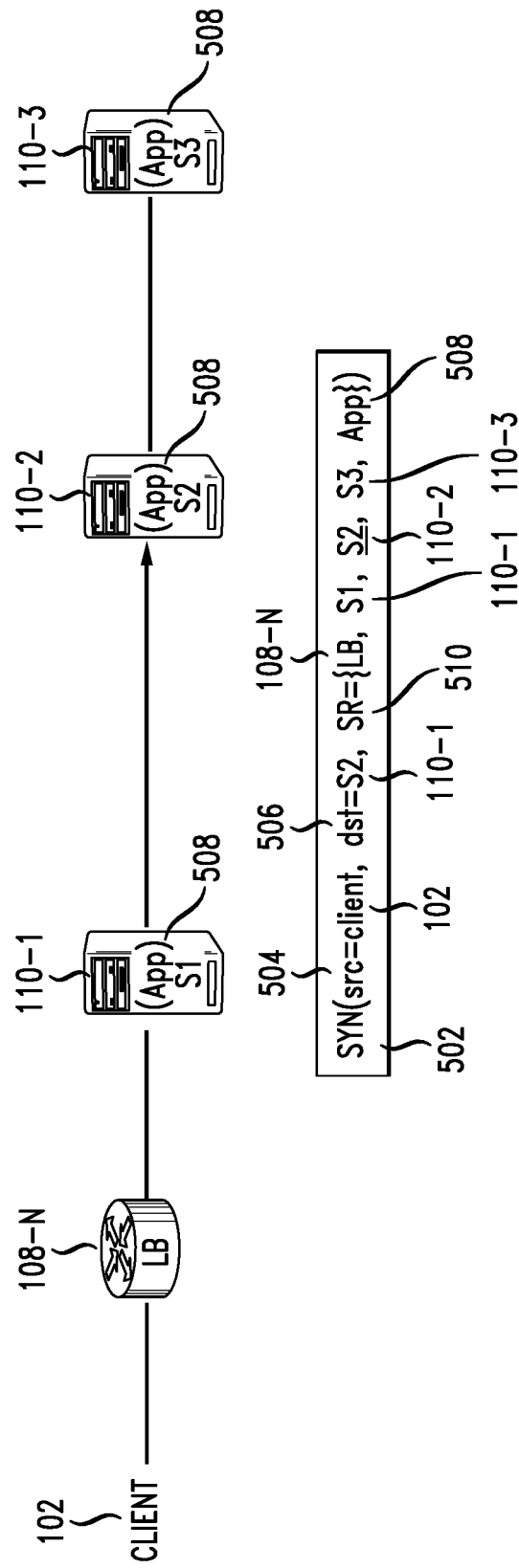

Referring to FIG. 5C, server 110-2 (S2) is shown as the next segment or node in the list of segments. When forwarding the request, the server 110-1 (S1) can identify the second candidate server 110-2 (S2) as the next or active segment in the list of segments on the SR header 510 and overwrite the destination address 506 to include the physical address of the next segment or destination, server 110-2 (S2). If server 110-2 (S2) is unable to accept the request 502, it will forward the request 502 to the next and last segment, server 110-3 (S3). On the other hand, if the server 110-2 (S2) is able to accept the request 502, it will process and accept the request 502 without forwarding to the next segment, as illustrated in FIG. 5D.

Figure 5D:
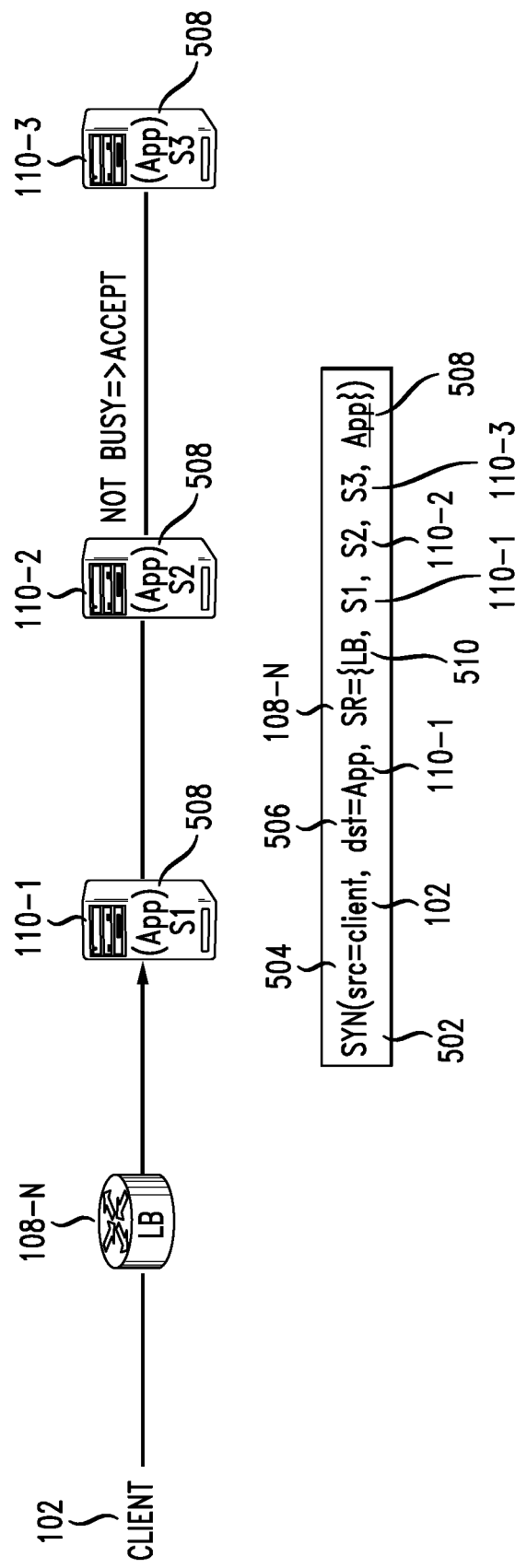

Referring to FIG. 5D, the server 110-2 (S2) accepts the request 502 and modifies the destination field 506 and SR header 510 to indicate that the server 110-2 (S2) accepted the connection to the application 508.

Figure 5E:
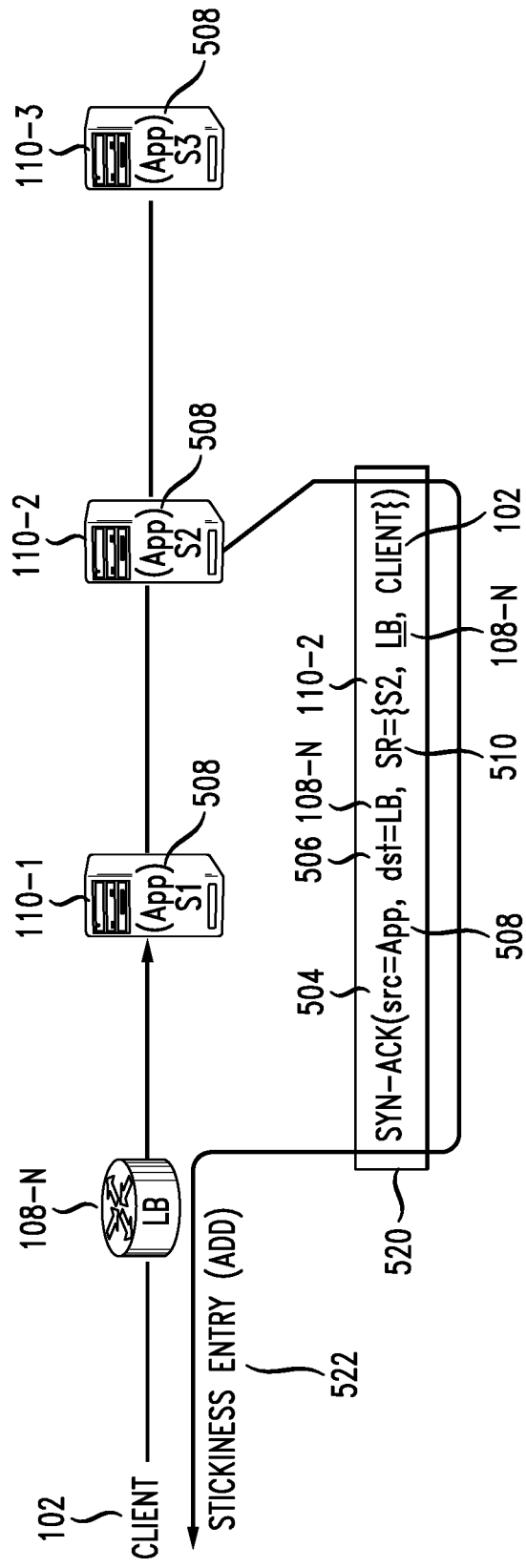

In FIG. 5E, the server 110-2 (S2) returns a packet 520 to the load balancer 108-N that is destined to the client 102. In this example, the packet 520 is a TCP SYN-ACK. The packet 520 identifies the application 508 in the source address field 504 and the load balancer 108-N in the destination field 506. The SR header 510 in the packet 520 is modified to include the server 110-2 (S2) which represents the sending node or segment, the load balancer 108-N which represents the next segment or return segment, and the client 102 which represents the destination.

This modified SR header 510 will inform the load balancer 108-N that the server 110-2 (S2) has accepted the connection and will be the destination server for traffic in this connection between the client 102 and the application 508. Thus, upon receiving the packet 520, the load balancer 108-N can identify server 110-2 (S2) in the SR header 510 and create a stickiness entry 522 at the load balancer 108-N indicating that traffic associated with this connection will be handled by server 110-2 (S2). The stickiness entry 522 can prevent the load balancer 108-N from sending future packets associated with this connection session to other destination servers, and can also allow future traffic to flow from the client 102 to the server 110-2 (S2) without having to traverse the load balancer 108-N.

Figure 5F:
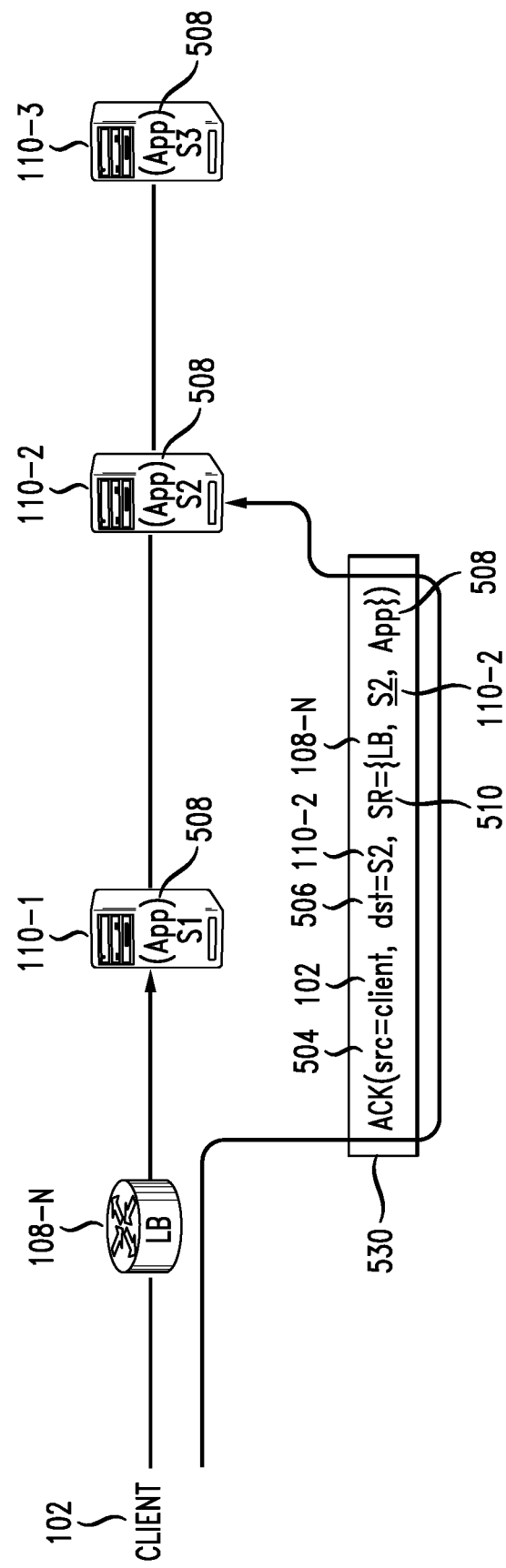

Referring to FIG. 5F, upon receiving the packet 520, the client 102 sends a packet 530 to the server 110-2 (S2) to acknowledge the packet 520 from the server 110-2 (S2). In this example, the packet 530 is a TCP ACK packet. The client 102 will send the packet 530 to the load balancer 108-N and towards the server 110-2 (S2). The source field 504 in the packet 530 will identify the client 102, and the destination field 506 will identify the server 110-2 (S2). The SR header 510 will no longer include the other candidate servers 110-1 (S1) or 110-3 (S3) in the SR header 510. Instead, the SR header 510 will identify the load balancer 108-N as the sending node or segment, server 110-2 (S2) as the next segment, and application 508 as the destination.

Figure 5G:
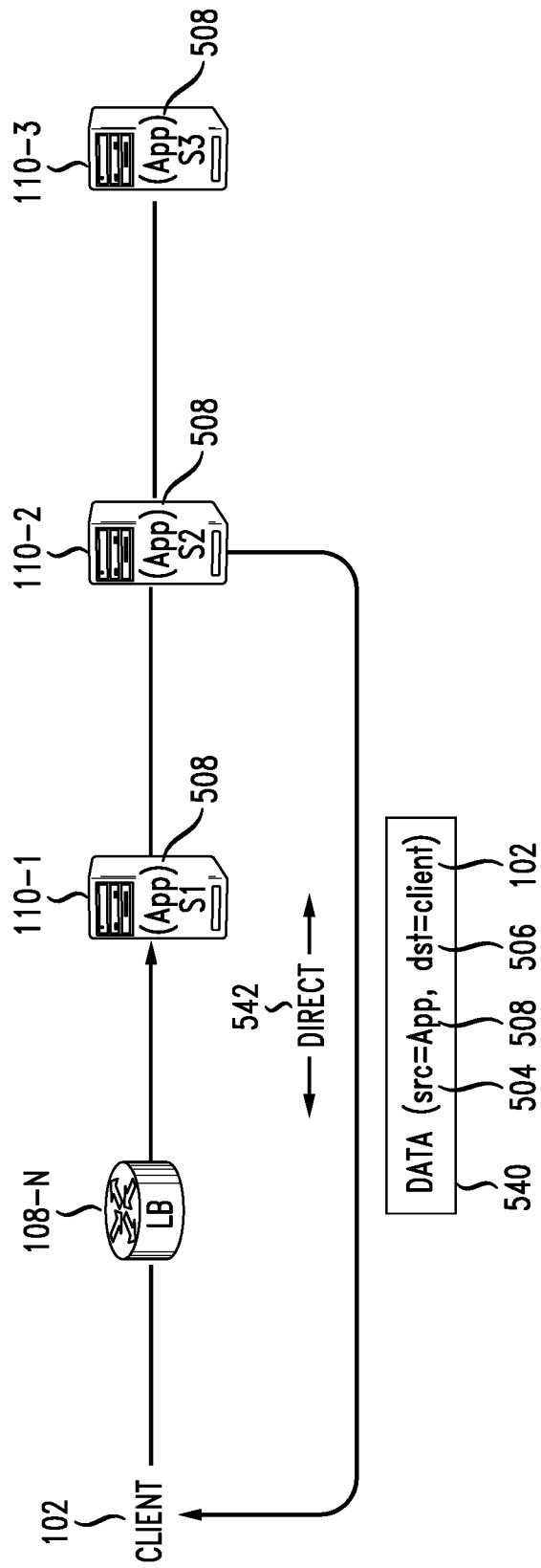

Referring to FIG. 5G, after receiving the packet 530, the server 110-2 (S2) then sends the data packet 540 to the client 102. Having established the handshake between the client 102 and server 110-2 (S2), the data packet 540 can be transmitted along a direct path 542 which excludes the load balancer 108-N. Thus, the client 102 can communicate with the application 508 more directly through server 110-2 (S2).

Figure 5H:
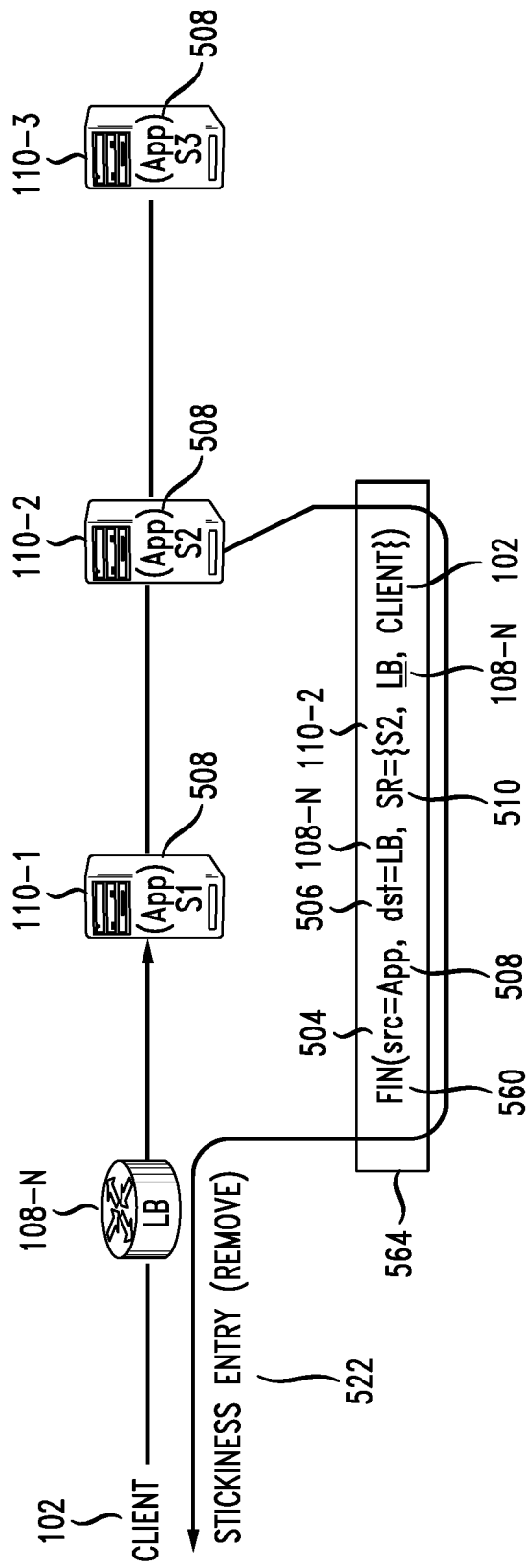

As shown in FIG. 5H, to terminate the connection session, the server 110-2 (S2) can send a packet 560 to the load balancer 108-N and towards the client 102 which indicates that the connection is to end. In this example, the packet 560 is a TCP FIN packet. The packet 560 will identify the application 508 in the source address field 504 and the load balancer 108-N in the destination address field 506. The source address field 504 and destination address field 506 in the packet 560 can provide the state of the flow, which associates the packet 560 with the application 508 and identifies the load balancer 108-N as the next destination of the packet 560.

The packet 560 will again include an SR header 510 to steer the packet 560 from the server 110-2 (S2) to the load balancer 108-N and towards the client 102. The SR header 510 will identify the server 110-2 (S2) as the sending or return segment, the load balancer 108-N as the next segment, and the client 102 as the destination.

The load balancer 108-N can use the packet 560 to manage the stickiness entry 522 previously added. For example, the load balancer 108-N can identify the server 110-2 (S2) in the SR header 510 and determine that a stickiness entry 522 exists which maps the server 110-2 (S2) to this connection between client 102 and the application 508 through server 110-2 (S2). The load balancer 108-N can also recognize that the packet 560 includes a flag or instructions to terminate the session (e.g., FIN), and in response, remove the stickiness entry 522. Thus, the packet 560 will terminate the session between the client 102 and application 508 through server 110-2 (S2) and remove the associated stickiness entry 522 at the load balancer 108-N. As a result, future connection requests or packets from client 102 received by the load balancer 108-N may undergo the SR load balancing process as previously described.

FIGS. 6A through 6F illustrate another load balancing example using segment routing and IPv6. The examples in FIGS. 6A through 6F are described with respect to communications in a TCP handshake. However, the TCP handshake is used herein as a non-limiting example for the sake of clarity and explanation purposes. It should be understood that the concepts herein are not limited to TCP communications and may be implemented with other protocols, including connection-oriented or connectionless transport protocols.

Figure 6A:
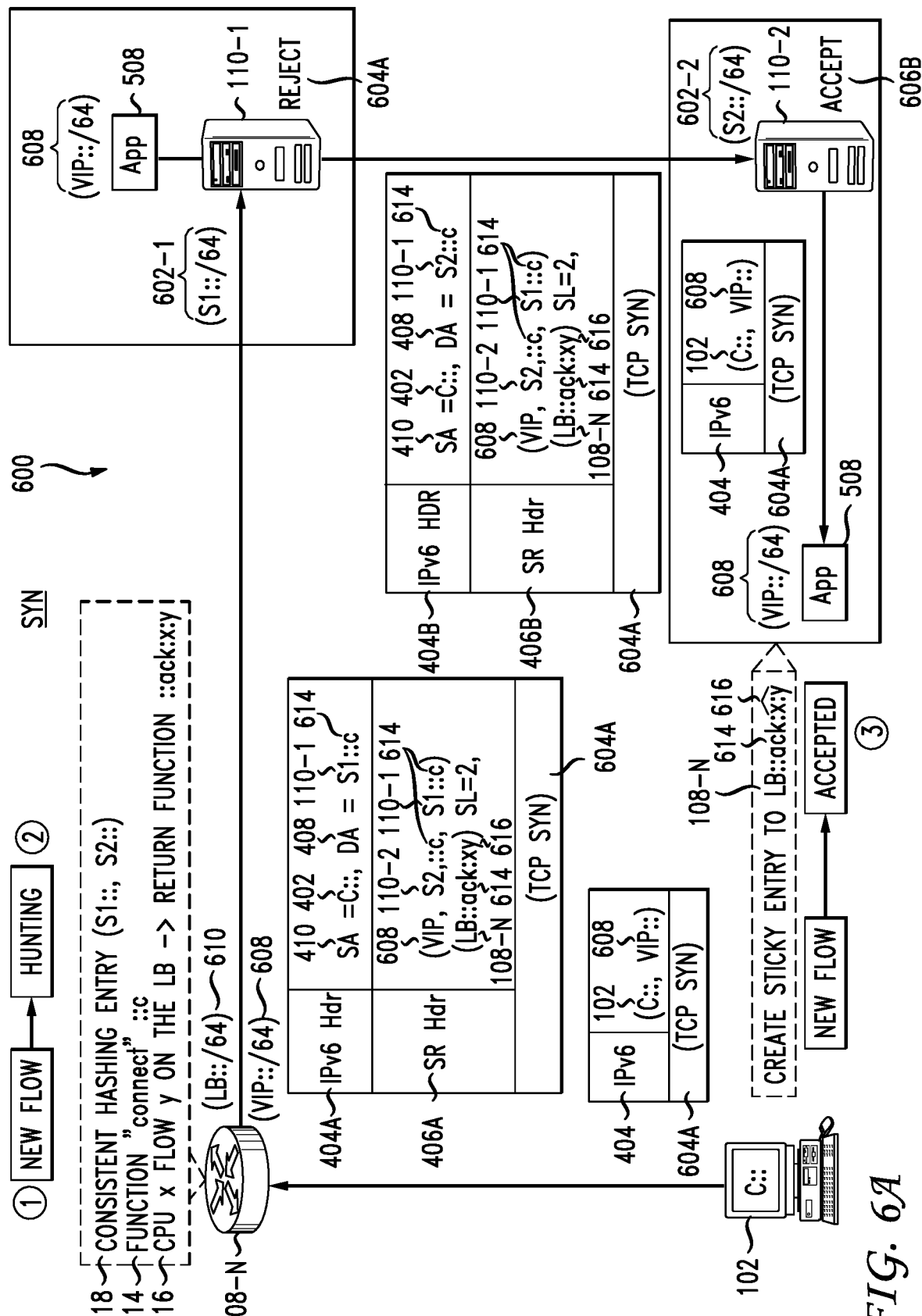
FIGS. 6A through 6F illustrate a load balancing example of a request.

FIG. 6A illustrates a schematic diagram of a load balancing example for a SYN request 600. Here, the client 102 first sends a packet 604A containing a request to connect with an application 508 associated with a virtual address 608 in the network. The packet 604A includes an IPv6 header 404 which identifies the client 102 (e.g., via an IP address of the client 102) as the source, and the virtual address 608 of the application 508 as the destination.

The load balancer 108-N can receive the packet 604A and process the packet 604A using SR load balancing as further described herein. The load balancer 108-N can receive the packet 604A sent by the client 102 from an edge device, such as a router 106 as illustrated in FIG. 1. The load balancer 108-N can have a network address 610 to communicate with other devices.

The load balancer 108-N can receive the packet 604A and identify the virtual address 608 as the destination in the IPv6 header 404. The load balancer 108-N can use the virtual address 608 to generate a hashing entry 618. As previously explained, the hashing entry 618 can map to a bucket which contains an SR policy that identifies a set of candidate servers for flows that map to that particular bucket. In this example, the hashing entry 618 maps packet 604A with server 602-1 (S1) and server 602-2 (S2), both of which host application 508 at virtual address 608 and may be load balancing candidates for processing the packet 604A.

The load balancer 108-N will then modify the IPv6 header 404 on the packet 604A to yield header 404A, and will insert SR header 406A into the packet 604A. The SR header 406A can include the destination of the packet 604A, which in this example is the virtual address 608 of the application 508, a list of SR segments or segment list which includes the segments representing the particular SR routing path that the packet 604A should traverse, and the return or sender address, which refers to the address 610 of load balancer 108-N in this example. For load balancing purposes, the segments in the list of SR segments will include the set of candidate servers from the hashing entry 618; namely, server 110-2 (S2) and 110-1 (S1). This will allow the packet to traverse through each of the set of candidate servers, server 110-2 and server 110-1, until a server from the set of candidate servers accepts the connection or packet. As the packet traverses each of the set of candidate servers, the respective candidate server can make a load balancing determination whether to accept or reject the connection or flow, to ensure traffic is load balanced between candidate servers based on various performance conditions and considerations as explained herein.

The SR header 406A can include a respective function 614 and a respective argument 616 for any of the segments included in the SR header 406A. The function 614 can include an instruction, command, or operation (e.g., connect, force connect, listen, forward, continue, next, push, end, etc.), a flag or label (e.g., flag such as a TCP ACK flag), a parameter, state information, routing information, etc. The argument 616 can include an attribute, instruction, parameter, etc. For example, the argument 616 can include instructions or parameters which can be used by nodes to identify state information, load balancing or steering information (e.g., information mapping a flow or packet to one or more resources, etc. Non-limiting examples of function 614 can include a connect function, a force connect function, state information (e.g., ACK, SYN, SYN-ACK, FIN, etc.), an end or terminate function, etc. Additional non-limiting examples are further described below with reference to FIG. 7. Non-limiting examples of arguments 616 can include a flow identifier, a resource identifier (e.g., CPU identifier), etc. The arguments 616 can be used to load balance or steer flows and resources. For example, the arguments 616 can include a flow identifier and a CPU identifier which together map the flow identified by the flow identifier to the CPU identifier for processing via the CPU associated with the CPU identifier.

To illustrate, the SR header 406A can include a respective function 614 for server 110-2 (S2) and server 110-1 (S1). The function 614 for server 110-2 (S2) can instruct server 110-2 (S2) to take a particular action upon receipt of the packet, and the function 614 associated with server 110-1 (S1) can instruct server 110-1 (S1) to take a particular action upon receipt of the packet. The function 614 corresponding the load balancer 108-N can also provide an instruction associated with load balancer 108-N (e.g., ACK, SYN, etc.), and the argument 616 can provide specific parameters associated with load balancer 108-N, such as steering, load balancing, or processing information for load balancer 108-N (e.g., a flow identifier and a resource identifier to map a flow to a resource on load balancer 108-N). The SR header 406A can also include other information, such as the number of segments in the list of segments (e.g., SL=2), which can correspond to the set of candidate servers in the list of segments.

In the example shown in FIG. 6A, the function 614 for server 110-2 (S2) is a connect function which requests a connection with server 110-2 (S2) and the function 614 for server 110-1 (S1) is also a connect function which requests a connection with server 110-1 (S1). In some examples, the function 614 associated with the last segment in the list of segments in the SR header 406A can be a force connect function to ensure that the last candidate server (i.e., server 110-1) does not reject the connection request.

The IPv6 header 404A is modified to steer the packet 604A towards the destination, virtual address 608. The source address field 410 on the IPv6 header 404A can identify the client 102 (e.g., the network address associated with client 102), but the destination address field 408 on the IPv6 header 404A will identify the address 602-1 of the first candidate server from the list of segments in the SR header 406, which in this example is server 110-1 (S1). The destination address field 408 can also include a function 614 for server 110-1 (S1), which in this example can be a connect function.

The load balancer 108-N sends the packet 604A with IPv6 header 404A and SR header 406A to network address 602-1 associated with server 110-1 (S1), which is the next segment in the list of segments and the first candidate server from the set of candidate servers. Server 110-1 (S1) can receive the packet 604A and make a local decision whether to accept the connection requested by the packet (e.g., SR function 614 for server 110-1 provided in the SR header 406A) or reject the connection. The server 110-1 (S1) can make the decision to accept or reject based on one or more factors, such as a current or future load at server 110-1 (S1), available resources at server 110-1 (S1), a status of application 508 on server 110-1 (S1), performance requirements associated with the request and/or application 508, real-time conditions and statistics, active sessions or requests associated with server 110-1 (S1), historical data, etc.

In this example, server 110-1 (S1) issues a reject decision 606A and thus refuses the connection request. Server 110-1 (S1) then identifies the next segment in the list of segments on the SR header 406A, which corresponds to the next candidate server, server 110-2 (S2), and forwards the packet 604A and request along the SR path (i.e., list of segments) to server 110-2 (S2). When forwarding the packet to server 110-2 (S2), server 110-1 (S1) modifies the IPv6 header 404A according to IPv6 header 404B, and may also modify the SR header 406A according to SR header 406B.

To generate the IPv6 header 404B, server 110-1 (S1) overwrites the address 602-1 of server 110-1 (S1) in the destination field 408 of the previous IPv6 header 404A, with the address 602-2 of server 110-2 (S2), which is the next segment or candidate server as determined based on the list of segments in the SR header 406A. Server 110-1 (S1) can also include an SR function 614 in the destination field 408 directing an action by server 110-2 (S2) upon receipt of the packet. In this example, the function 614 is a connect function, which requests a connection with server 110-2 (S2). In some cases, since server 110-2 (S2) in this example is the last candidate server, the function 614 can be a force connect function to force server 110-2 (S2) to accept the connection request in order to prevent the connection from being dropped or refused by all servers.

Server 110-2 (S2) receives the packet 604A from server 110-1 (S1) and makes a decision whether to accept the connection requested by the packet (e.g., SR function 614 for server 110-2 provided in the SR header 406) or reject the connection. The server 110-2 (S2) can make the decision to accept or reject based on one or more factors, as previously explained. In this example, server 110-2 (S2) is the last candidate server and, upon receiving the packet 604A, issues an accept decision 606B to accept the connection request in function 614 of the SR header 406B. In some cases, server 110-2 (S2) will forcefully accept the connection because it is the last candidate server and/or because the function 614 will include a force connect instruction.

Server 110-2 (S2) can strip the SR header 406B from the packet 604A and modify the IPv6 header 404B according to IPv6 header 404C, to remove the address 602-2 of server 110-2 (S2) from the destination field and instead identify the virtual address 608 of the application 508 as the destination for the packet 604A. Server 110-2 (S2) will forward the packet 604A with IPv6 header 404C to the application 508 at the virtual address 608 for processing.

In some cases, the server $s_i$ (i∈{1, 2}) that has accepted the connection; namely, server 110-2 (S2), can enter a state STICKY_WAIT for the flow. While in this state, the server 110-2 (S2) will steer traffic from the application 508 towards the load balancer 108-N at load balancer address 610, so the load balancer 108-N can learn which server has accepted the connection. For this, the server 110-2 (S2) can insert an SR header in the return packet and include an SR function 614 to load balancer 108-N to create a sticky entry with an acknowledgment ACK 614 with parameters 616 (e.g., flow identifier and CPU identifier for steering the flows to a particular CPU) for flows associated with the application 508 and client 102. The SR header can include, for example, the segment list ($s_i$; lb::cs; c) in packets coming from the application 508, where cs stands for a createStickiness function and c is a connect function.

Figure 6B:
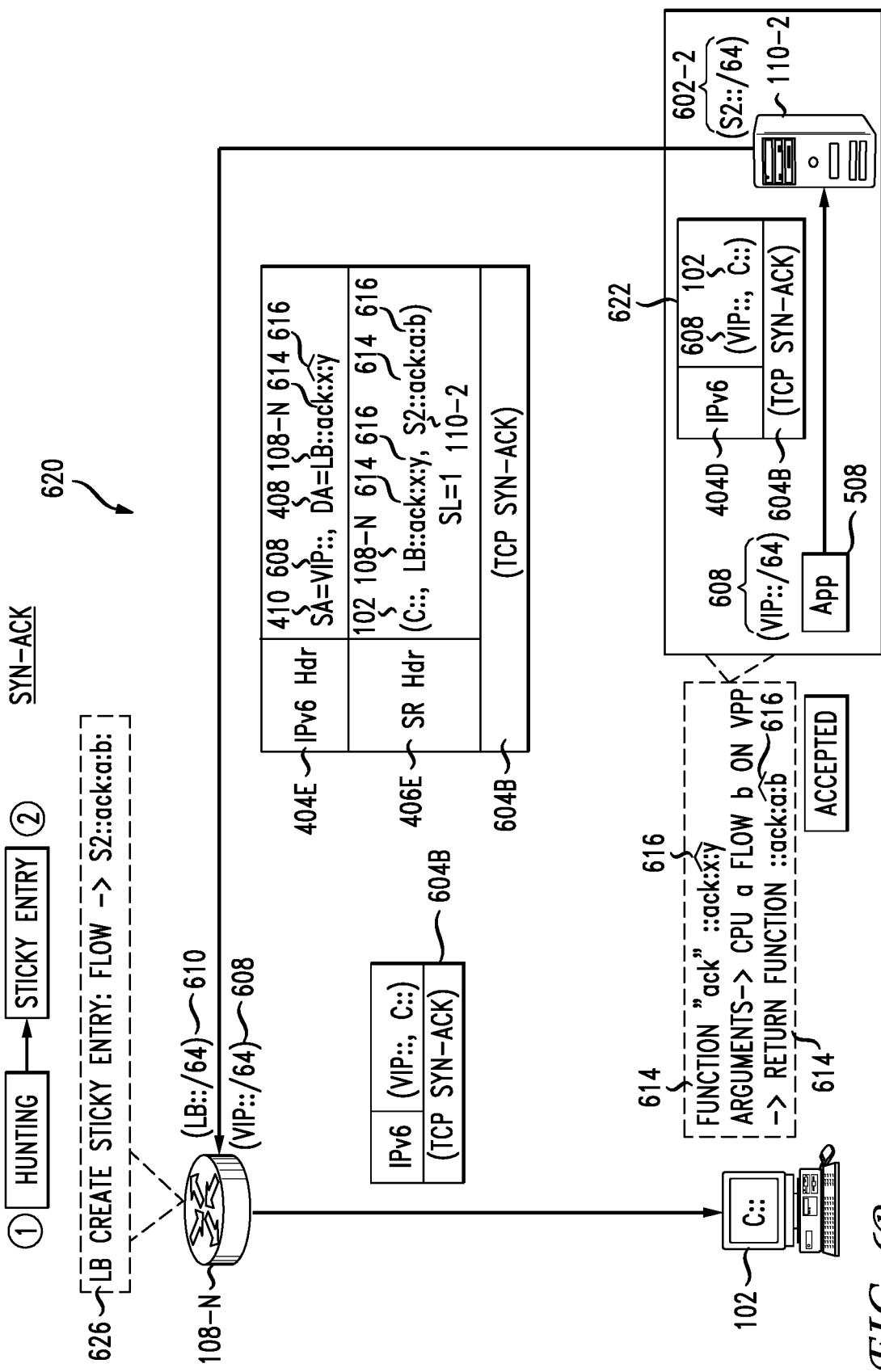
Figure 8:
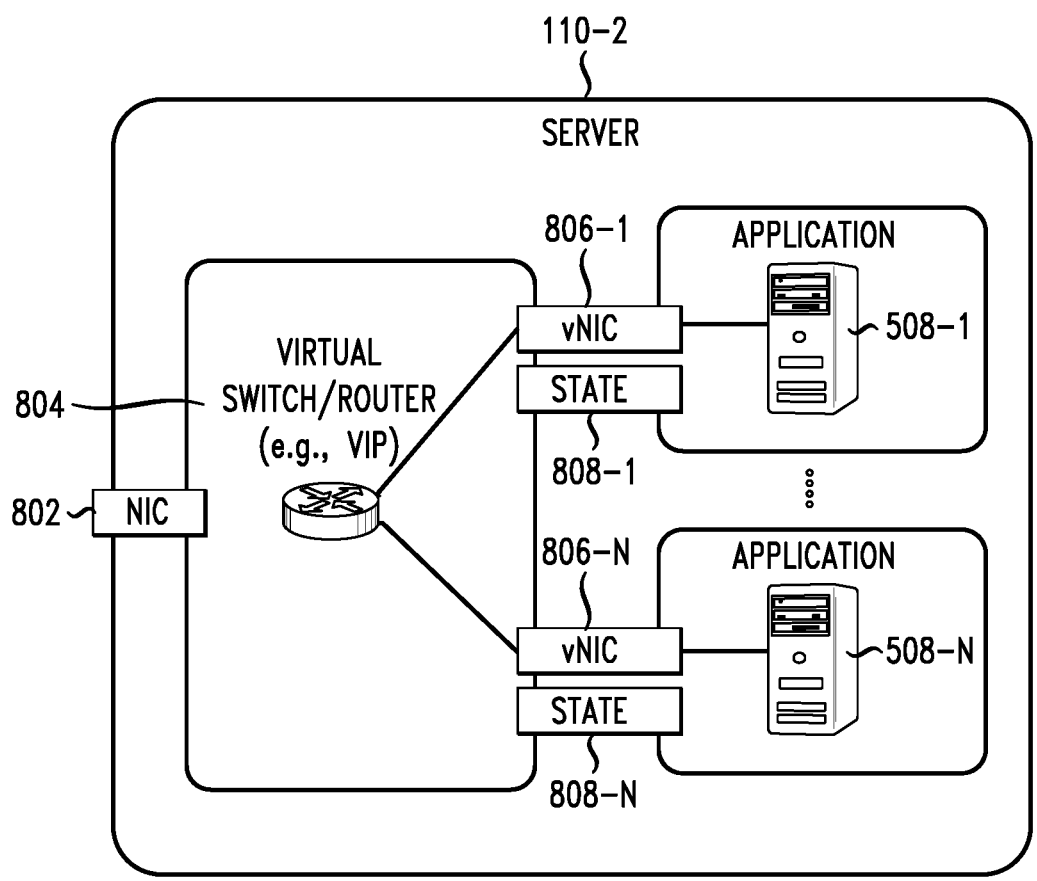
FIG. 8 illustrates an example server-side architecture for candidate servers suitable for application-aware load balancing.

FIG. 6B illustrates a SYN-ACK communication 620 in response to SYN communication 600. The SYN-ACK communication 620 allows server 110-2 (S2) to acknowledge the accepted connection and send a return function 614 towards the client 102 and load balancer 108-N. The return function 614 can include an ACK function or flag with arguments 616 mapping CPU a to Flow b on a virtual switch or router, as shown in FIG. 8, which routes traffic between address 602-2 on server 110-2 (S2) and virtual address 608 of application 508 on server 110-2 (S2). The application 508 can send the SYN-ACK packet 604B to address 602-2 of server 110-2 (S2) via the virtual switch or router, as shown in FIG. 8 and described further below. The server 110-2 (S2) will then steer the packet 604B to the client 102.

The packet 604B can include IPv6 header 404D with the virtual address 608 identified as the source and client 102 as the destination. Server 110-2 (S2) then modifies packet 604B to include SR header 406C and a modified IPv6 header 404E. The SR header 406C can identify the client 102 as the destination, load balancer 108-N as the next segment in the routing path, and server 110-2 (S2) as the source or return server or segment. The SR header 406C includes a function 614 (ACK) for load balancer 108-N and arguments 616 (e.g., CPU x and Flow y). The SR header 406C can also include function 614 (ACK) and arguments 616 (e.g., mapping the application 508 to CPU a and Flow b). The SR functions 614 and arguments 616 associated with load balancer 108-N and server 110-2 (S2) in the SR header 406C can be used by the load balancer 108-N to create a sticky entry for the connection associated with the SYN-ACK communication 620.

The modified IPv6 header 404E can identify the virtual address 608 in the source address field 410 and the load balancer 108-N (or LB address 610) in the destination address field 408, to steer the packet 604B to LB address 610 of load balancer 108-N. The destination address field 408 can include SR function 614 (ACK) and arguments 616 (e.g., mapping CPU x to Flow y at load balancer 108-N) to steer the packet 604B to load balancer 108-N according to the arguments 616.

Upon receiving packet 604B and modifying the packet 604B to include SR header 406C and IPv6 header 404E, the server 110-2 (S2) forwards packet 604B to LB address 610 of load balancer 108-N. When load balancer 108-N receives the packet 604B, it enters a sticky entry 626 which provides a STICKY_STEER state, mapping the flow associated with the SYN-ACK communication 620 (i.e., Flow b identified in SR arguments 616 of return function 614) to server 110-2 (S2) and return function 614 containing an ACK with parameters 616 a and b (e.g., steering Flow b to CPU a). The load balancer 108-N strips the SR header 406C, and modifies the IPv6 header 404E in packet according to IPv6 header 404F, which identifies virtual address 608 as the source and client 102 as the destination. The load balancer 108-N then forwards packet 604B to client 102.

Based on the sticky entry 626, subsequent traffic from the client 102 to the application 508 can be sent by the load balancer 108-N using an SR header that identifies the load balancer 108-N, server 110-2 (S2) as the server for that traffic, and virtual address 608 as the destination. For example, subsequent traffic from the client 102 can be transmitted to the application 508 using the SR header (LB; S2::as; VIP), where LB stands for LB address 610 of load balancer 108-N, S2 stands for address 602-2 of server 110-2 (S2), as stands for a function ackStickiness permitting both steering of the traffic directly to the server 110-2 (S2), and acknowledging the creation of a stickiness entry.

Figure 6C:
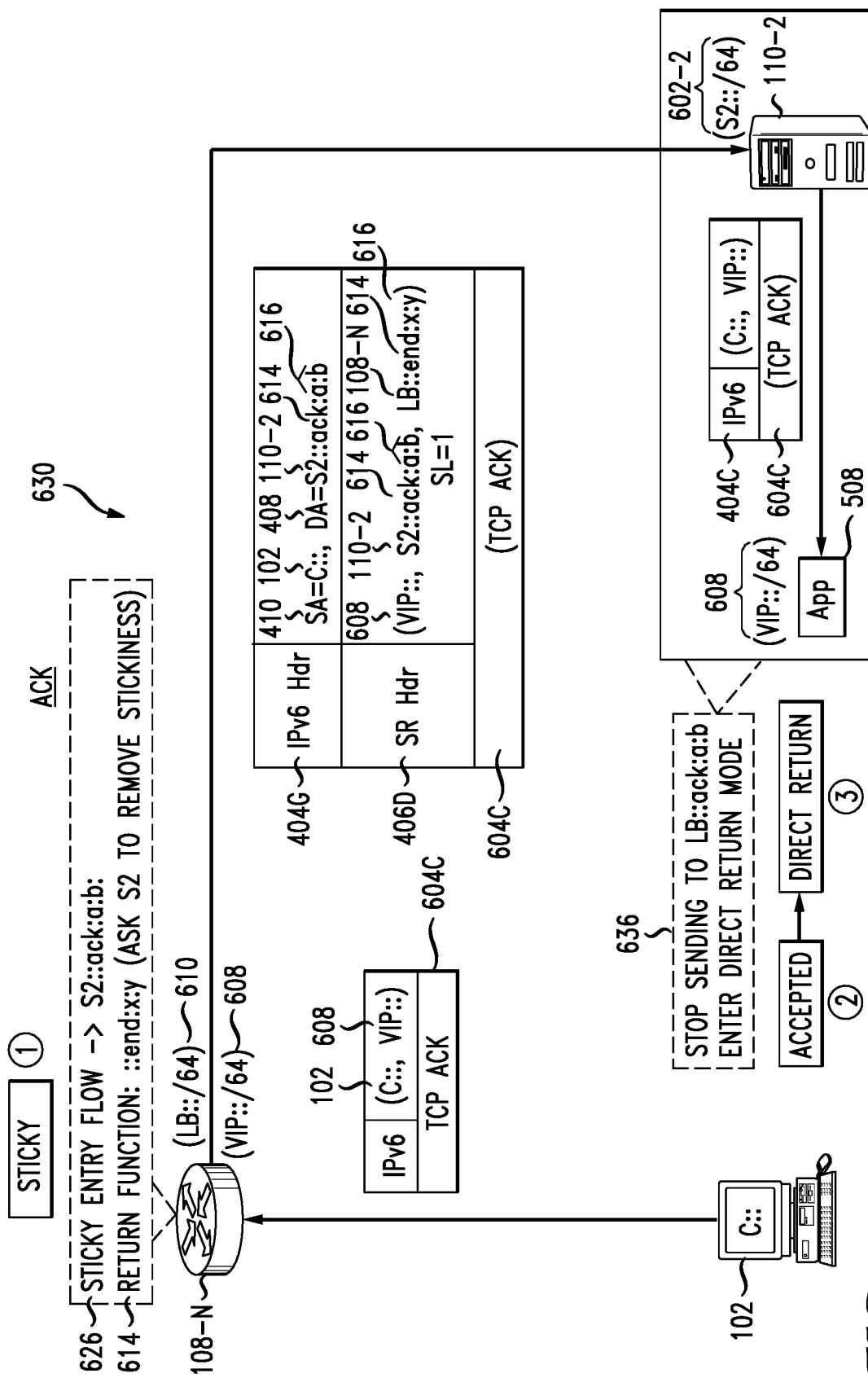

FIG. 6C illustrates an ACK communication 630 routed as described above according to sticky entry 626. In this example, the client 102 sends an ACK packet 604C with an IPv6 header 404 that identifies the client 102 as the source and virtual address 608 of application 508 as the destination. The load balancer 108-N receives the packet 604C, identifies the sticky entry 626 associated with the packet, and generates a return function 614 asking server 110-2 (S2) to remove the stickiness (e.g., end function with parameters identifying CPU x and Flow y). The load balancer 108-N modifies the IPv6 header 404 according to IPv6 header 404G, and inserts SR header 406D with the return function 614, and forwards packet 604C to server 110-2 (S2).

The SR header 406D includes the virtual address 608 of application 508 as the destination, address 602-2 for server 110-2 (S2) for steering traffic directly to server 110-2 (S2) with the corresponding SR function 614 and arguments 616 (e.g., ACK CPU a Flow b) for server 110-2 (S2), and LB address 610 of load balancer 108-N and the corresponding return function 614 and arguments 616 (e.g., END CPU x Flow y), asking server 110-2 (S2) to remove stickiness. Notably, in this example, because traffic is steered directly to server 110-2 (S2), the SR header 406D does not include additional candidate servers previously included in the list of segments (i.e., server 110-1), as the traffic no longer needs to traverse those servers.

The load balancer 108-N forwards packet 604C to server 110-2 (S2) based on the IPv6 header 404G which identifies server 110-2 (S2) in the destination address field 408 as the destination server for packet. In other words, the destination address field 408 in the IPv6 header 404G can route the packet 604C to the correct server destination, server 110-2 (S2). The source address field 410 and destination address field 408 can thus contain any necessary state for the traffic, thus limiting the need for nodes to store state information for the flow.

When server 110-2 (S2) receives the packet 604C, it can strip the SR header 406D and modify the IPv6 header according to IPv6 header 404C, and forward the packet 604C to the application 508 at virtual address 608. The server 110-2 (S2) can enter a STICKY DIRECT state 636 for the flow. The STICKY DIRECT state 636 can instruct the server 110-2 (S2) to send any subsequent traffic for this flow directly to the client 102, which can be done without using SR or including an SR header. In this state, traffic received from the load balancer 108-N (e.g., ACK packets from the client 102) can still be sent to the ackStickiness function of the correct server. The STICKY DIRECT state 636 can indicate to stop sending traffic to load balancer 108-N ACK packets mapping CPU a and Flow b.

Figure 6D:
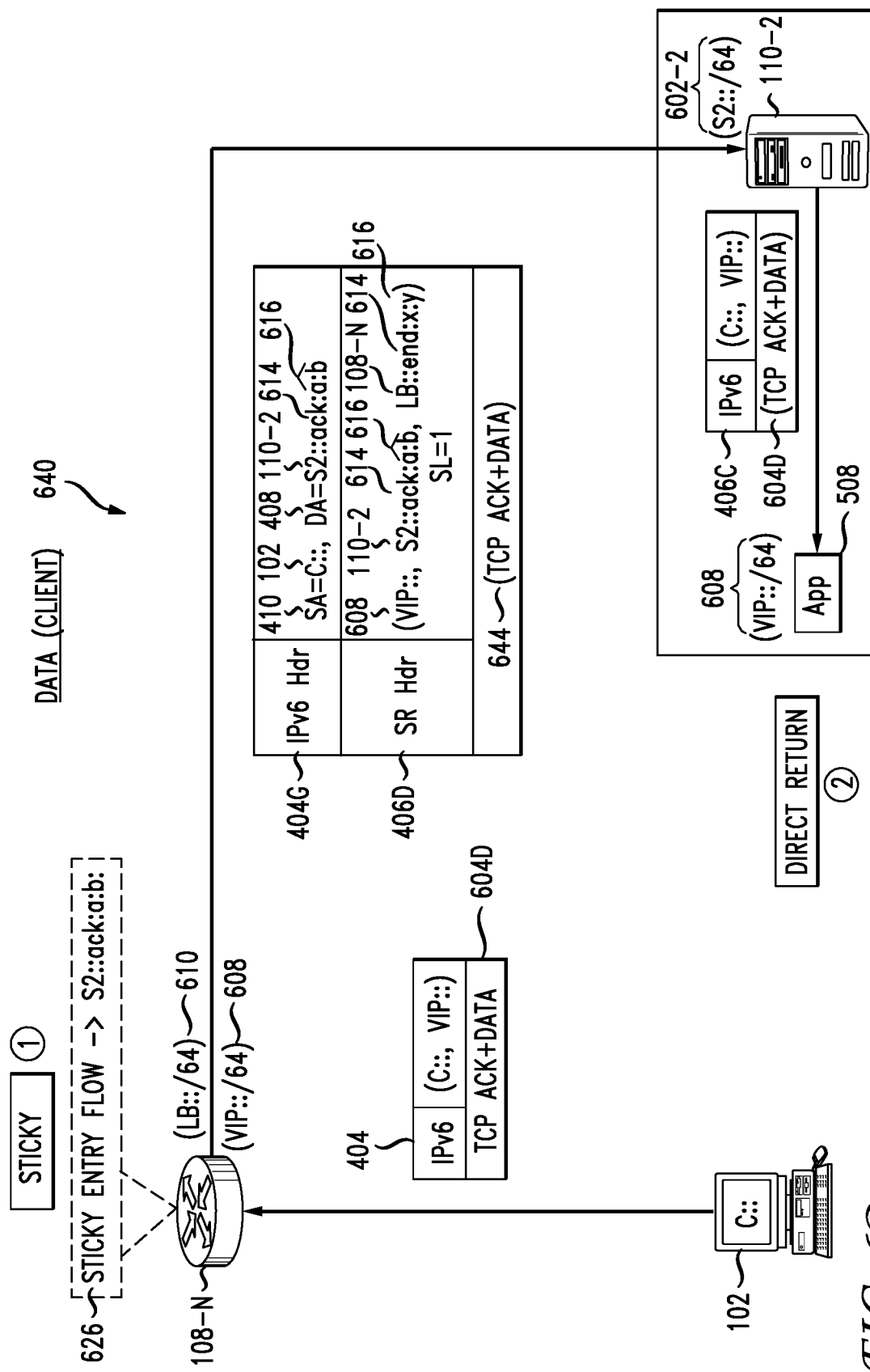

FIG. 6D illustrates a data communication 640 from client 102 following the ACK communication 630. The client 102 first sends an ACK with data packet 604D to virtual address 608. The load balancer 108-N receives the packet 604D at LB address 610 and identifies sticky entry 626 which maps server 110-2 (S2) to ack with CPU a and Flow b. The load balancer 108-N inserts SR header 406D into packet 604D, and modifies the IPv6 header 404 to IPv6 header 404G, which can route the packet to server 110-2 (S2). The SR header 406D contains the virtual address 608, a segment based on sticky entry 626 which contains S2 (server 110-2) and function ACK with arguments a and b corresponding to CPU a and Flow b, as well as an entry identifying LB address 610 of load balancer 108-N with function END and parameters x and y corresponding to CPU x and Flow y. This END:x:y: function and arguments associated with load balancer 108-N will provide a removeStickiness instruction for arguments x and y.

The load balancer 108-N then forwards the packet 604D to server 110-2 (S2). Server 110-2 (S2) receives the packet 604D at address 602-2 of server 110-2 (S2) and forwards the ACK and data packet 604D to virtual address 608 associated with application 508.

Figure 6E:
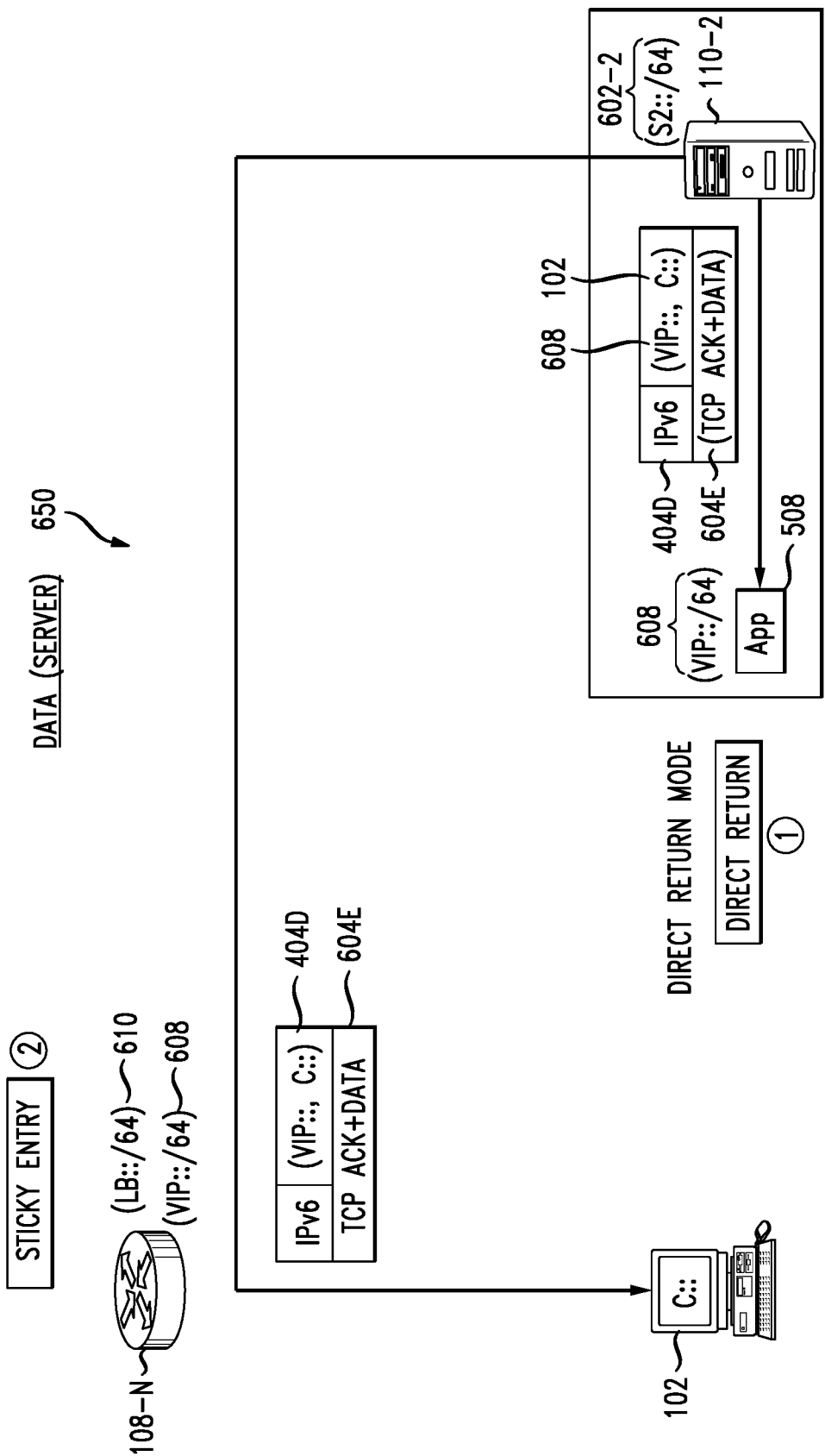

FIG. 6E illustrates a data communication 650 from application 508 at server 110-2 (S2) to the client 102. The data communication 650 includes a data packet 604E responsive to the data communication 640 from the client 102. In this example, the data packet 604E follows a direct mode from server 110-2 (S2) to the client 102. In other words, the server 110-2 (S2) routes the data packet 604E back to the client 102 without going through the load balancer 108-N. The data packet 604E can include any data provided by the application 508 at the server 110-2 (S2) for client 102, based on the data communication 640 from the client 102 previously received by the application 508, as illustrated in FIG. 6D.

Figure 6F:
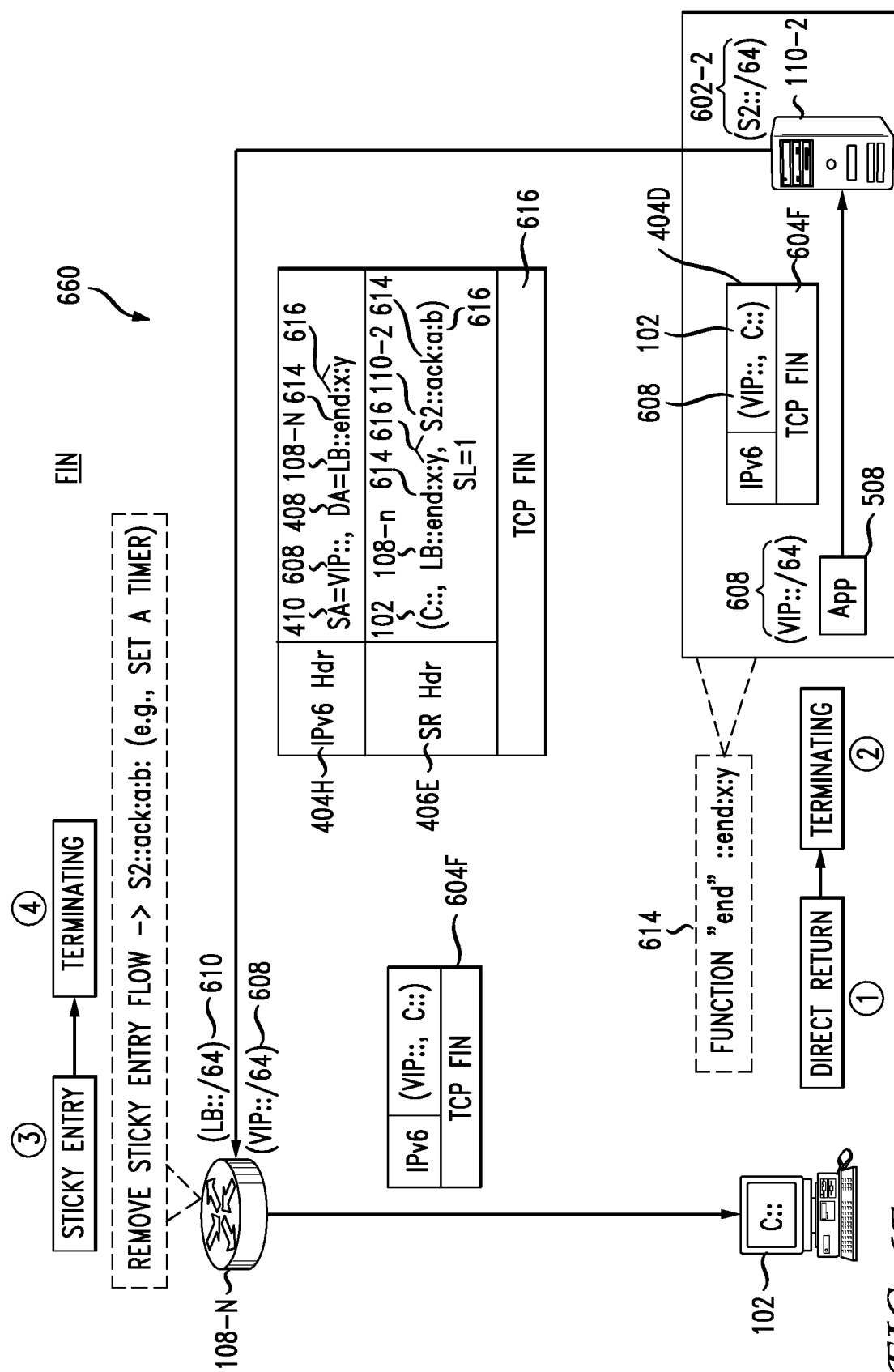

The client 102 and application 508 on server 110-2 (S2) can continue to communicate data in direct mode as illustrated in FIGS. 6D and 6E until the connection or session between client 102 and server 110-2 (S2) is terminated. FIG. 6F illustrates a communication 660 from application 508 on server 110-2 (S2) to the client 102, for terminating the connection or session with the client 102.

In this example, the server 110-2 (S2) transmits a FIN packet 604F from application 508 to the client 102. The FIN packet 604F can be routed through the load balancer 108-N to notify the load balancer 108-N that the connection or session is being terminated. To route the FIN packet 604F through the load balancer 108-N, the server 110-2 (S2) modifies the IPv6 header 404D according to IPv6 header 404H, to include the LB address 610 of the load balancer 108-N in the destination address field 408 of the packet. The server 110-2 (S2) can also include a function 614 to end the connection or session and remove the sticky entry previously created for server 110-2 (S2) at the load balancer 108-N. In this example, the function 614 is an "END" function for terminating a TCP connection, and includes the arguments 616 "x" and "y" referring to CPU x and Flow y associated with the TCP connection at load balancer 108-N.

The server 110-2 (S2) also inserts an SR header 406E which includes a list of segments as well as any functions 614 and/or arguments 616. In this example, the SR header 406E includes client 102, load balancer 108-N, and server 110-2 (S2). Load balancer 108-N is included with the function 614 and arguments 616 END: x: y, as previously explained, for terminating the TCP connection. The server 110-2 (S2) is included with a function 614 and arguments ACK: a: b, corresponding to the sticky entry for server 110-2 (S2) at the load balancer 108-N.

The load balancer 108-N receives the FIN packet 604F and forwards it to the client 102. In addition, the load balancer 108-N can remove the sticky entry for server 110-2 (S2) based on the function 614 and arguments 616 in the SR header 406E, or otherwise set a timer or condition for removal of the sticky entry. The TCP connection is terminated and future requests or flows from the client 102 to application 508 would go to the load balancer 108-N and may undergo the SR load balancing as previously described.

FIG. 7 illustrates a diagram 700 of an example handshake protocol state machine for a flow routed using SR load balancing. The state machine can be maintained at one or more nodes, such as load balancer 108-N, for example. The state machine can include a state 702 for the flow, an incoming SR function 704 for the flow, an SR function added 706, and a next state 708 for the flow.

The SR functions 704, 706 can be encoded in the SR header of a packet to indicate an action to be taken by a node in the SR header. Moreover, the SR functions will depend on the address of the first segment in the SR list (e.g., the "sender" of the function). The SR functions can be denoted by $s \cdot f \cdot (x)$, where s corresponds to the physical prefix of the node receiving the packet, $f$ corresponds to a function for the node, and x corresponds to an argument for the function. Thus, when a node with a physical prefix of s receives a packet with SR header (x, . . . , s::$f$, . . . ), the node will perform a function $f$ with argument x, which is denoted by $s \cdot f \cdot (x)$.

In some cases, SR functions can be implemented for failure recovery. For example, when adding or removing an instance of a load balancer, ECMP rebalancing may occur, and traffic corresponding to a given flow may be redirected to a different instance. The consistent hashing algorithm previously described can ensure that traffic corresponding to this flow is still mapped to the same SR list (e.g., s1; s2) as before the rebalancing. In order to reestablish stickiness to the correct server $s_i$ (ie$\{1,2\}$), incoming data packets corresponding to an unknown flow are added an SR header (lb; $s_1$::r; $s_2$::r; VIP), where r is an SR function recoverStickiness, lb refers to the load balancer lb, VIP refers to the virtual address of an application, and $s_1$ and $s_2$ correspond to servers 1 and 2 respectively. When receiving a packet for this SR function, a server that had accepted the connection will re-enter the STICKY_STEER state, so as to notify the load balancer. Conversely, a server that had not accepted the connection will simply forward the packet to the next server in the SR list.

FIG. 8 illustrates an example server-side architecture for SR load balancing. This example depicts server 110-2 (S2). As illustrated, server 110-2 (S2) can host applications 508-1 through 508-N (collectively "508"), which can communicate with a virtual switch or router 804 on server 110-2 (S2), via respective virtual network interfaces 806-1 through 806-N (collectively "806"). The virtual switch or router 804 can communicate with a physical network interface 802 associated with server 110-2 (S2), which can be mapped to a physical prefix assigned to server 110-2 (S2) on the network. The applications 508 can provide a respective state 808-1 through 808-N (collectively "808") to the virtual switch or router 804, which can include a metric of the application's load state.

The state 808 can provide load information to the virtual switch or router 804 to help decide whether to accept or reject a connection request containing a connect function for the applications 508. When the virtual switch or router 804 receives a packet with a connect function for one of the applications 508, it can look at the respective state 808 of that application to determine whether to accept or deny the request based on the application's load, and either forward the request the application or the next server in the SR list included in the packet's SR header. Thus, the SR list in the SR header of the packet can identify multiple servers hosting an application identified in a request in order to load balance the request between the servers, and the servers can make local load balancing decisions as they receive the packet based on the state of the application. The virtual switch or router at each server can decide whether to forward the request to the application on the host server or to the next server on the SR list.

The individual servers or virtual switches or routers can implement an acceptance policy or algorithm to determine whether to accept or reject requests. An example algorithm is illustrated below:

---

Algorithm 2 Static Connection Acceptance Policy for each packet triggering connectAvail do
    b ←number of busy threads associated with the application
    if b < c then
        forward packet to application
    else
        forward packet to second server in SR list
    end if
end for
for each packet triggering connectForce do
    forward packet to application
end for

---

Other algorithms are also contemplated herein. For example, some algorithms may provide static policies and other algorithms may provide dynamic policies, as further described below.

Static Policy

Let n be the number of the application's worker threads, and c a threshold parameter between 0 and n. In Algorithm 2, a policy is implemented where SR c, whereby the first server accepts the connection if and only if less than c worker threads are busy. When c=0, the requests are satisfied by the next servers in the SR list, and when c=n, the requests are satisfied by the first server.

The choice of the parameter c has a direct influence on the behavior of the system. Small values of c will yield better results under light loads, and high ones will yield better results under heavy loads. If the load pattern is known by the operator, the parameter c can be manually selected so as to maximize the load-balancing efficiency. If this is not the case, a dynamic policy can be used in order to automatically tune the value of the parameter.

Dynamic Policy

The dynamic policy SR dyn can be used when the typical request load is unknown, for example. If the rejection ratio of the connectAvail function is 0, only the first server candidates in the SR lists will serve requests; when this ratio is 1, only the next candidate(s) will serve requests. Therefore, to maximize utility of the system, a specific ratio, such as ½, can be set as a goal for the system. This can be done by maintaining at each server a window of last connectAvail results, and dynamically adapting the value of c so that it stays close to the ratio. An example of this procedure is illustrated below in Algorithm 3.

---

Algorithm 3 Dynamic Connection Acceptance Policy

```
c ← 1 {or other initial value}
accepted ← 0
attempt ← 0
window ← 50 {or other window value}
for each packet triggering connectAvail do
    attempt← attempt + 1
    if attempt = window then
        if accepted/window < 0:4 ^ c < n then
            c ← c + 1
        else if accepted/window > 0:6 ^ c > 0 then
            c ← c − 1
        end if
        attempt ← 0
        accepted ← 0
    end if
    b number of Application's busy threads
    if b < c then
        accepted ← accepted + 1
        forward packet to application
    else
        forward packet to second server in SR list
    end if
end for
for each packet triggering connectForce do
    forward packet to application
end for
```

---

Figure 9:
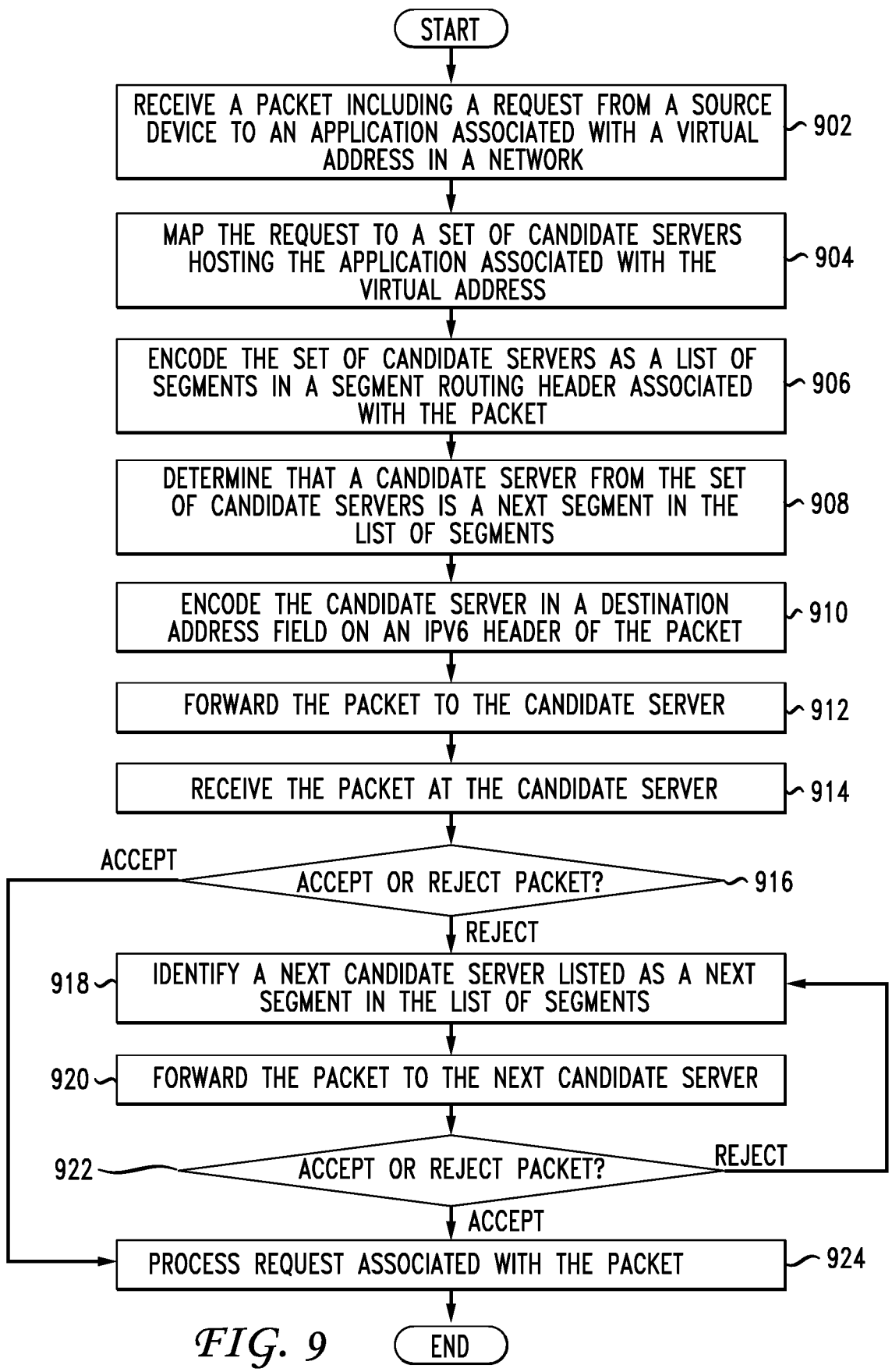
FIG. 9 illustrates an example method for application-aware load balancing using segment routing.

Having described example systems and concepts, the disclosure now turns to the method embodiment illustrated in FIG. 9. For the sake of clarity, the steps in the method are described with reference to the example network 100, as shown in FIG. 1.

At step 902, a load balancer 108-1 receives a packet including a request from a source device 102 to an application associated with a virtual address. The application can be hosted by multiple application servers 110 in the network. The application servers 110 can host respective instances of the application at the virtual address. Each of the application servers 110 can have a physical network address or prefix identifying the server in the network.

At step 904, the load balancer 108-1 maps the request to a set of candidate servers 110 hosting the application associated with the virtual address. For example, the load balancer 108-1 can apply a consistent hashing mechanism to the request, as previously described, to identify a bucket for the request. The bucket can include an SR routing or load balancing policy which identifies multiple candidate servers 110 assigned to that bucket for load balancing requests that hash to that bucket. The load balancer 108-1 can identify the bucket for the request and determine which servers 110 the request should be mapped to based on the SR routing or load balancing policy corresponding to that bucket.

At step 906, the load balancer 108-1 encodes the set of candidate servers as a list of segments in a segment routing header associated with the packet. The list of segments in the segment routing header can identify the sender of the packet, the set of candidate servers, and the destination (e.g., virtual address) of the packet. The list of segments can also include one or more segment routing functions for successively steering the packet through the set of candidate servers until one of the set of candidate servers accepts the request. The segment routing functions can be associated with specific segments in the list of segments, and can indicate a function to be performed by the associated segment.

At step 908, the load balancer 108-1 can determine that a first candidate server from the set of candidate servers is a next segment in the list of segments. The load balancer 108-1 can identify the first candidate server based on the SR policy in the corresponding bucket, for example, or otherwise select a first server from the first set of candidate servers. At step 910, the load balancer 108-1 encodes the first candidate server in a destination address field on an IPv6 header of the packet. The destination address field can represent or identify the next routing segment for the packet, which can correspond to the first candidate server. The first candidate server can also be included in the list of segments in the SR header, as previously described.

At step 912, the load balancer 108-1 can forward the packet to the first candidate server. The load balancer 108-1 can forward the packet to the first candidate server based on the destination address field from step 910. The IPv6 header can be used to route the packet to the next destination, as well as maintain state information for the packet. The segment routing header can steer the packet through the candidate servers until the request is accepted by a candidate server.

As the candidate servers receive the packet, they can decide whether to accept or deny the request based on a load of the application at the server. Thus, the candidate servers can perform local load balancing decisions as they receive the packet. If a candidate server rejects the request, it can forward the packet to the next candidate server from the list of segments in the segment routing header. When forwarding the packet, the candidate server can modify the IPv6 header to include the next server in the destination address field.

If a candidate server accepts the request, it can forward the request to the application on the server and establish a connection with the source device 102. The candidate server that accepts the request can reply with a packet that identifies itself as the accepting server based on a segment routing header included in the packet. The accepting server can modify the IPv6 header of the return packet to direct the packet through the load balancer 108-1 and towards the source device 102. The packet can include in the IPv6 header and/or the segment routing header a function and any arguments for the load balancer to indicate that the server has accepted the request and establish a sticky entry at the load balancer 108-1 for subsequent communications in the session.

For example, at step 914, the first candidate server receives the packet and, at step 916, determines whether to accept or deny the request in the packet. If the first candidate server accepts the request, it processes the request at step 924. If the first candidate rejects the request, at step 918 it identifies a next candidate server listed as a next segment in the list of segments. At step 920, the first candidate server can then forward the packet to the next candidate server. The next candidate server then receives the packet and at step 922, determines whether to accept or reject the request. If the next candidate server accepts the request, it processes the packet at step 924. If the next candidate server rejects the request, it can identify a next candidate server at step 918, as previously described. The packet can continue being routed through candidate servers until a candidate server accepts the request or until the packet reaches the last candidate server. The last candidate server can be forced to accept the request to avoid the request from being rejected altogether.

The disclosure now turns to FIGS. 10 and 11, which illustrate example network devices and computing devices, such as switches, routers, load balancers, client devices, and so forth.

FIG. 10 illustrates an example network device 1000 suitable for performing switching, routing, load balancing, and other networking operations. Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1004 to efficiently perform routing computations, network diagnostics, security functions, etc.

Although the system shown in FIG. 10 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing and/or switching operations. The ASIC can communicate with other components in the network device 1000 via the bus 1010, to exchange data and signals and coordinate various types of operations by the network device 1000, such as routing, switching, and/or data storage operations, for example.

FIG. 11 illustrates a computing system architecture 1100 wherein the components of the system are in electrical communication with each other using a connection 1105, such as a bus. Exemplary system 1100 includes a processing unit (CPU or processor) 1110 and a system connection 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the actual processor design. The processor 1110 may be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include services 1132, 1134, 1136 for controlling the processor 1110. Other hardware or software modules are contemplated. The storage device 1130 can be connected to the system connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving a packet comprising a request from a source device to an application associated with a virtual address in a network;
   mapping the request to a set of candidate servers hosting the application associated with the virtual address;
   encoding the set of candidate servers as a list in a routing header associated with the packet, the list in the routing header comprising one or more routing instructions for successively steering the packet through the set of candidate servers until one of the set of candidate servers accepts the request;
   selecting a first candidate server from the set of candidate servers is in the list;
   encoding the first candidate server in a destination address field on an IPv6 header of the packet; and
   forwarding the packet to the first candidate server.

2. The method of claim 1, further comprising:
   generating a lookup index comprising a plurality of hash buckets, wherein each respective hash bucket from the plurality of hash buckets is assigned a respective list of candidate servers, wherein each candidate server in the respective list of candidate servers is selected from a plurality of candidate servers hosting the application.

3. The method of claim 2, wherein mapping the request to the set of candidate servers comprises:
   hashing the packet to yield one or more hash values;
   based on the one or more hash values, associating the packet with a particular hash bucket from the plurality of hash buckets in the lookup index to yield a packet and bucket association; and
   based on the packet and bucket association, mapping the packet to the respective list of candidate servers assigned to the particular hash bucket, the respective list of candidate servers comprising the set of candidate servers.

4. The method of claim 3, wherein the set of candidate servers comprises servers hosting the application at the virtual address, wherein mapping packet to the set of candidate servers comprises mapping the packet to respective physical prefixes corresponding to the servers.

5. The method of claim 1, wherein encoding the first candidate server in the destination address field on the IPv6 header of the packet comprises:
   based on a determination that the first candidate server is the next in the list, overwriting a first network address in the destination address field of the IPv6 header with a second network address corresponding to the first candidate server.

6. The method of claim 1, wherein the routing header further comprises a first indication of a return address and a second indication of the virtual address associated with the application, wherein each of the routing instructions comprises an instruction to a respective entry in the list for processing the packet, the instruction comprising at least one of a connect instruction, an end instruction, a data flag, a forward instruction, a stickiness instruction, and state information.

7. The method of claim 6, wherein the destination address field on the IPv6 header comprises a 64 bit-segment identifying a node prefix, a first 32-bit segment identifying a routing function, and a second 32-bit segment identifying one or more parameters for the routing function.

8. A non-transitory computer readable media storing instructions which when executed cause a system to perform operations comprising:
- receiving a packet comprising a request from a source device to an application associated with a virtual address in a network;
- mapping the request to a set of candidate servers hosting the application associated with the virtual address;
- encoding the set of candidate servers as a list in a routing header associated with the packet, the list in the routing header comprising one or more routing instructions for successively steering the packet through the set of candidate servers until one of the set of candidate servers accepts the request;
- selecting a first candidate server from the set of candidate servers is in the list;
- encoding the first candidate server in a destination address field on an IPv6 header of the packet; and
- forwarding the packet to the first candidate server.

9. The media of claim 8, the operations further comprising:
- generating a lookup index comprising a plurality of hash buckets, wherein each respective hash bucket from the plurality of hash buckets is assigned a respective list of candidate servers, wherein each candidate server in the respective list of candidate servers is selected from a plurality of candidate servers hosting the application.

10. The media of claim 9, wherein mapping the request to the set of candidate servers comprises:
- hashing the packet to yield one or more hash values;
- based on the one or more hash values, associating the packet with a particular hash bucket from the plurality of hash buckets in the lookup index to yield a packet and bucket association; and
- based on the packet and bucket association, mapping the packet to the respective list of candidate servers assigned to the particular hash bucket, the respective list of candidate servers comprising the set of candidate servers.

11. The media of claim 10, wherein the set of candidate servers comprises servers hosting the application at the virtual address, wherein mapping packet to the set of candidate servers comprises mapping the packet to respective physical prefixes corresponding to the servers.

12. The media of claim 8, wherein encoding the first candidate server in the destination address field on the IPv6 header of the packet comprises:
- based on a determination that the first candidate server is the next in the list, overwriting a first network address in the destination address field of the IPv6 header with a second network address corresponding to the first candidate server.

13. The media of claim 8, wherein the routing header further comprises a first indication of a return address and a second indication of the virtual address associated with the application, wherein each of the routing instructions comprises an instruction to a respective entry in the list for processing the packet, the instruction comprising at least one of a connect instruction, an end instruction, a data flag, a forward instruction, a stickiness instruction, and state information.

14. The media of claim 13, wherein the destination address field on the IPv6 header comprises a 64 bit-segment identifying a node prefix, a first 32-bit segment identifying a routing function, and a second 32-bit segment identifying one or more parameters for the routing function.

15. A system, comprising:
- a non-transitory computer readable memory storing instructions;
- a processor programmed to execute the instructions in the memory to perform operations comprising:
    - receiving a packet comprising a request from a source device to an application associated with a virtual address in a network;
    - mapping the request to a set of candidate servers hosting the application associated with the virtual address;
    - encoding the set of candidate servers as a list in a routing header associated with the packet, the list in the routing header comprising one or more routing instructions for successively steering the packet through the set of candidate servers until one of the set of candidate servers accepts the request;
    - selecting a first candidate server from the set of candidate servers is in the list;
    - encoding the first candidate server in a destination address field on an IPv6 header of the packet; and
    - forwarding the packet to the first candidate server.

16. The system of claim 15, the operations further comprising:
- generating a lookup index comprising a plurality of hash buckets, wherein each respective hash bucket from the plurality of hash buckets is assigned a respective list of candidate servers, wherein each candidate server in the respective list of candidate servers is selected from a plurality of candidate servers hosting the application.

17. The system of claim 16, wherein mapping the request to the set of candidate servers comprises:
- hashing the packet to yield one or more hash values;
- based on the one or more hash values, associating the packet with a particular hash bucket from the plurality of hash buckets in the lookup index to yield a packet and bucket association; and
- based on the packet and bucket association, mapping the packet to the respective list of candidate servers assigned to the particular hash bucket, the respective list of candidate servers comprising the set of candidate servers.

18. The system of claim 17, wherein the set of candidate servers comprises servers hosting the application at the virtual address, wherein mapping packet to the set of candidate servers comprises mapping the packet to respective physical prefixes corresponding to the servers.

19. The system of claim 15, wherein encoding the first candidate server in the destination address field on the IPv6 header of the packet comprises:
- based on a determination that the first candidate server is the next in the list, overwriting a first network address in the destination address field of the IPv6 header with a second network address corresponding to the first candidate server.

20. The system of claim 15, wherein the routing header further comprises a first indication of a return address and a second indication of the virtual address associated with the application, wherein each of the routing instructions comprises an instruction to a respective entry in the list for processing the packet, the instruction comprising at least one of a connect instruction, an end instruction, a data flag, a forward instruction, a stickiness instruction, and state information.

* * * * *